United States Patent
Gerhardt et al.

[11] Patent Number: 6,048,284
[45] Date of Patent: Apr. 11, 2000

[54] PULLEY WITH A DAMPER BETWEEN ROTARY INPUT AND OUTPUT MEMBERS

[75] Inventors: Friedrich Gerhardt, Leutesheim; Peter Klein, Edenkoben; Heinz Molt, Heiningen; Joachim Hoffmann, Appenweier/Nesselried; Herbert Kiefer-Gander, Rheinmünster; Alexander Ellert, Bühlertal; Helmut Kohler, Bühlertal; Wolfgang Haas, Achem/Fautenback, all of Germany

[73] Assignee: LuK Lamellen und Kupplungsbau GmbH, Buhl, Germany

[21] Appl. No.: 08/774,059

[22] Filed: Dec. 23, 1996

[30] Foreign Application Priority Data

Dec. 22, 1995 [DE] Germany ............... 195 48 460

[51] Int. Cl.⁷ ................................. F16H 55/36
[52] U.S. Cl. ........................... 474/178; 474/902
[58] Field of Search ............... 474/166, 168, 474/170, 177, 178, 902

[56] References Cited

FOREIGN PATENT DOCUMENTS 44 20 178 A 1  12/1994  Germany .
44 34 324 A 1   4/1995  Germany .

*Primary Examiner*—David A. Bucci
*Assistant Examiner*—Matthew A. Kaness
*Attorney, Agent, or Firm*—Darby & Darby

[57] ABSTRACT

A pulley which can be driven by the output element of the engine in a motor vehicle to transmit torque to one or more endless belts or chains has a rotary input member, a rotary output member and a damper which yieldably opposes rotation of the input and output members relative to each other about a common axis and is at least partially confined in an annular chamber defined by at least one of the input and output members. The chamber can further receive a friction bearing which operates between the input and output members, as well as a vibration absorbing device. Such device can have a mass which is adjacent a flange of one of the input and output members and one or more energy storing elements acting in the circumferential direction of the pulley.

96 Claims, 9 Drawing Sheets

6,048,284

PULLEY WITH A DAMPER BETWEEN ROTARY INPUT AND OUTPUT MEMBERS

BACKGROUND OF THE INVENTION

The invention relates to improvements in pulleys or sheaves (hereinafter called pulleys) in general, and more particularly to improvements in pulleys which can be utilized with advantage to receive torque from and/or to transmit torque to rotary aggregates in motor vehicles such as, for example, combustion engines, electric motors, dynamos (light generators), air conditioning units and/or others. Still more particularly, the invention relates to pulleys which can be utilized to transmit torque between the rotary input/output element of a prime mover (such as a combustion engine in a motor vehicle) and the rotary input output element of an auxiliary aggregate such as dynamo or an air conditioning unit in a motor vehicle.

It is already known to provide a pulley with coaxial input and output members which are rotatable with and relative to each other, and with a torque transmitting damper which yieldably opposes rotation of the input and output members relative to one another. The damper can comprise coil springs or springs of an elastomeric material. It is also known to provide a bearing which is installed between and permits rotation of the input and output members relative to each other, as well as a vibration damping device which also operates between the input and output members.

A drawback of conventional pulleys of the above outlined character is that they are too bulky and/or too expensive and/or that they occupy a substantial amount of space, e.g., under the hood of a motor vehicle. Furthermore, the useful life of heretofore known damper-containing pulleys is relatively short, and such pulleys cannot be readily assembled and/or inspected and/or repaired and/or replaced at the locale of actual use.

OBJECTS OF THE INVENTION

An object of the invention is to provide a simple, compact and relatively inexpensive pulley which can be utilized as a superior substitute for heretofore known pulleys of the type wherein coaxial input and output members can rotate relative to each other against the opposition of one or more dampers.

Another object of the invention is to provide a pulley whose useful life is longer than that of heretofore known damper-containing pulleys and which can be utilized with advantage for the transmission of torque between a prime mover and one or more aggregates, such as between a combustion engine and a dynamo and/or a pump and/or an air conditioning unit in a motor vehicle.

A further object of the invention is to provide a novel and improved damper for use in the above outlined pulley.

An additional object of the invention is to provide novel and improved input and output members for use in the above outlined pulley.

Still another object of the invention is to provide novel and improved bearings for use between the input and output members of the above outlined pulley.

A further object of the invention is to provide novel and improved vibration damping or absorbing devices for use in the above outlined pulley.

Another object of the invention is to provide a pulley which comprises a relatively small number of simple and relatively inexpensive component parts.

An additional object of the invention is to provide a novel distribution or arrangement of component parts in the above outlined pulley.

Still another object of the invention is to provide a pulley whose operation and/or reliability and/or torque transmitting capacity is not influenced by the RPM of the prime mover which transmits torque to the input member of the improved pulley.

A further object of the invention is to provide a pulley which can be utilized in and can receive torque from the combustion engine of a passenger car or another motor vehicle and which can transmit torque in a highly predictable fashion irrespective of whether the engine is idling or its output element is driven at a maximum rotational speed.

Another object of the invention is to provide a pulley which can transmit torque to or receive torque from chains, cords, belts or other suitable endless torque receiving and/or transmitting elements.

An additional object of the invention is to provide a pulley which can compensate for or absorb slight as well as highly pronounced fluctuations of transmitted torque to enhance the comfort to the occupant(s) of a motor vehicle.

Still another object of the invention is to provide a novel and improved method of rapidly assembling or dismantling the above outlined pulley.

SUMMARY OF THE INVENTION

One feature of the present invention resides in the provision of a pulley which comprises first and second members adapted to be rotated with and relative to each other about a common axis. The first member is the input member and the second member is the output member of the pulley. In accordance with a feature of the invention, at least one of these members defines a chamber extending at least substantially in a circumferential direction of the first member, and the pulley further comprises a bearing which is interposed between the two members, a damper which is arranged to yieldably oppose rotation of the two members relative to each other and includes at least one energy storing element acting in the aforementioned circumferental direction and being disposed in the chamber, and a vibration damping device including a part (hereinafter called mass) also disposed in the chamber.

One of the members is or can be designed (such as configurated and dimensioned to be connectable to a rotary shaft, and such pulley can further comprise a damping unit which is arranged to connect the mass of the vibration damping device with the shaft.

At least one of the members can be provided with an externally profiled (such as grooved, toothed and/or ribbed) torque transmitting portion extending at least substantially in the direction of the common axis of the two members; such profiled surface can be engaged by a properly profiled belt, chain or other suitable endless torque transmitting element which can be driven by or which can drive the pulley. The profiled portion is preferably positioned in such a way that it is located radially outwardly of the mass of the vibration damping device and/or radially outwardly of the damper. In accordance with a presently preferred embodiment of the invention, the mass, the damper and the profiled portion are interfitted into each other as seen in the direction of the common axis of the two members. The arrangement is preferably such that the profiled portion at least partially surrounds the mass and/or the damper, as seen in the direction of the common axis of the two members. For example, the mass can be immediately adjacent to and can be disposed radially inwardly of the profiled portion.

The input member can be arranged to receive torque from a rotary output device (e.g., from the camshaft or the crankshaft of an internal combustion engine in a motor vehicle), and such input member can further constitute the input element of the damper.

The pulley can further comprise a hub including a flange which forms part of one of the two members. Such flange can be provided with at least one window for at least one energy storing element acting in the circumferential direction of the two members; such at least one energy storing element can constitute the aforementioned at least one energy storing element of the damper or an energy storing element of the vibration damping device. Thus, the vibration damping device can also comprise at least one energy storing element (such as a coil spring) acting in the circumferential direction of the two members, particularly between the mass and one of the input and output members of the pulley. The at least one coil spring of the vibration damping device can be interposed (i.e., it can act) between the aforementioned flange of one of the two members and the mass of the vibration damping device.

The mass of the vibration damping device can be designed in such a way that it comprises two components (e.g., in the form of discs) which flank one of the two members of the pulley (as seen in the direction of the common axis of such members). The member which is flanked by the two components of the mass can include or constitute the aforementioned flange which latter preferably extends at least substantially radially of the common axis between the two components of the mass. The components and the member between them can be provided with at least partially registering openings (e.g., in the form of windows), and such pulley can further comprise energy storing means provided in the openings and acting in the circumferential direction of the two members. The energy storing means can include the aforementioned at least one energy storing element of the damper or at least one energy storing element of the vibration damping device. The openings can include a first window which is provided in one component of the mass and has a first width (as seen radially and/or circumferentially of the common axis of the two members), and a second window provided in the other component of the mass and having a second width greater than the first width.

As already mentioned above, the vibration damping device can also include one or more resilient energy storing elements, e.g., at least one prestressed coil spring which is installed in the chamber to act in the circumferential direction of the input and output members.

The vibration damping device can further comprise one or more distancing elements interposed between the two components of the mass and extending at least in part through that member (such as the aforementioned flange) which is flanked by the two components.

The damper or the vibration damping device can further comprise at least one resilient element acting in the direction of the common axis of- the two members between one component of the mass and that member which is flanked by the two components. Such at least one resilient element can constitute or comprise at least one diaphragm spring. The coil spring(s) of the vibration damping device acts or act in the circumferential direction of the two members and can be disposed radially outwardly of the at least one resilient element (such as the aforementioned diaphragm spring(s)). The coil spring(s) of the vibration damping device can operate in parallel with a friction generating assembly which forms part of the vibration damping device and includes the at least one resilient element.

The at least one energy storing element of the damper in the chamber which is defined by at least one of the input and output members of the pulley is or can be disposed radially inwardly of the mass of the vibration damping device.

The at least one energy storing element of the damper can include a coil spring which extends in the circumferential direction of the two members and has a diameter (as measured radially of the common axis of the two members) which is or which can be a minute fraction of the length of the coil spring (as measured in the circumferential direction of the two members), i.e., the length of the coil spring can be a multiple of (e.g., at least four times) its diameter.

The damper can include at least two groups of coil springs or other suitable energy storing elements. The energy storing elements of at least one of these groups can include a first energy storing element having a first rigidity (stiffness) and a second energy storing element having a second rigidity (stiffness) different from the first rigidity. The first and second energy storing elements of the at least one group can abut each other end-to-end, as seen in the circumferential direction of the two members of the pulley.

If the at least one energy storing element of the damper includes a coil spring, such coil spring can be an arcuate coil spring which extends in the circumferential direction of the two members of the pulley and has a curvature which preferably at least approximates a curvature imparted to the coil spring prior to confinement in the chamber, i.e., the coil spring can be caused to assume an arcuate shape prior to its installation in the chamber and such imparted curvature can at least approximate the optimum curvature of the coil spring in the fully assembled pulley.

The at least one energy storing element of the damper can engage at least one abutment which is provided on one of the two members of the pulley, e.g., on the first member; such at least one abutment can be of one piece with the respective member of the pulley, e.g., it can constitute a deformed (upset or otherwise displaced) portion of the respective member.

The chamber can be defined, at least in part, by the output member of the pulley, and the aforementioned externally profiled torque transmitting portion for engagement with a belt, chain or another suitable endless flexible element can be provided on the output member.

At least the output member of the pulley can consist, at least in part, of sheet metal and can include a radially outer portion (such as the aforementioned externally profiled portion) extending at least substantially in the direction of the common axis of the two members. Such output member can further include a second portion (e.g., a disc-shaped portion) extending substantially radialy inwardly from one axial end of the radially outer portion, and at least one abutment provided on the second portion and engageable with or engaging the at least one energy storing element of the damper.

In accordance with a presently preferred embodiment, each member of the pulley can consist, at least in part, of sheet metal and the chamber can be defined jointly by the two members of the pulley. One of these members is provided with the externally profiled torque transmitting portion and the other member extends at least substantially radially inwardly from the profiled portion and includes at least one abutment engaging the at least one energy storing element of the damper.

The externally profiled portion of one of the two members of the pulley can be located next to and radially outwardly of the chamber for the at least one energy storing element of the damper and for the mass of the vibration damping device.

The chamber can be at least partially filled with a supply of viscous material, such as grease, and at least one of the two members can be provided with at least one inlet for the introduction of viscous material into the chamber. A stopper, such as a plastic stopper, can be sealingly received in the at least one inlet. The at least one inlet can communicate with a radially inner portion of the chamber. The at least one energy storing element of the damper can include at least one coil spring (or a plurality of arcuate coil springs disposed end-to-end as seen in the circumferential direction of the two members of the pulley); the quantity of viscous material in the chamber can be selected in such a way that at least the radially outer portion of the at least one coil spring is immersed in (i.e., dips into) the viscous material.

It is also possible to provide the chamber with an unsealed radially inner portion (i.e., to omit the stopper or stoppers) because the viscous material normally fills the radially outer portion of the chamber under the action of centrifugal force and, once confined in the radially outer portion, tends to remain therein owing to its viscosity.

If one of the two members of the pulley comprises two sections of sheet metal, it can further comprise distancing means serving to connect such sections to each other. The distancing means can be disposed radially inwardly of the at least one energy storing element of the damper, i.e., the radial distance of the distancing means from the common axis of the two members can exceed the radial distance of the at least one energy storing element from such axis. The distancing means can be of one piece with one of the two sections.

Alternatively, the distancing means can comprise one or more threaded fasteners which connect the two sections of the one member to each other. Still further, it is possible to employ distancing means in the form of one or more rivets; such rivet or rivets can be of one piece with one of the two sections.

If one of the members comprises two sections which are connected to each other by distancing means, the other member can include or constitute the aforementioned flange of a hub which is coaxial with the two members, and the distancing means can extend—at least in part—through such flange.

The bearing between the two members of the improved puley can include or constitute a friction bearing. Such friction bearing can be interposed between the externally profiled torque transmitting portion of one of the two members and the radially outer portion of the flange forming part or constituting the other member. Such flange can extend at least substantially radially outwardly from the common axis of the two members to have a radially outermost portion radially inwardly adjacent the internal surface of the externally profiled portion.

The friction bearing can include a ring which is mounted or which can be mounted in such a way that it shares the rotary movements of one of the two members of the pulley. For example, the ring can consist of or contain a metallic material (such as steel) . Alternatively, the friction bearing can include a plastic ring, e.g., a ring made of or containing polyamide; such plastic ring can contain a reinforcing material, e.g., glass fibers.

It is also possible to employ a friction bearing which is a press fit on the aforementioned flange forming part of or constituting one of the two members. Alternatively, the friction bearing can include or constitute a coat of plastic material which is extruded onto or otherwise applied directly to the aforementioned flange forming part of or consituting one of the two members.

The pulley can further comprise at least one resilient element which directly or indirectly reacts against one of the two members and directly or indirectly bears against the other member in the general direction of the common axis of the two members. The at least one resilient element can include a diaphragm spring, and this at least one resilient element can be constructed and installed to operate in parallel with the at least one energy storing element of the damper.

A single component or one component (e.g., a disc-shaped component) of the mass of the vibration damping device can be positioned adjacent a portion (e.g., a radially extending wall) of that member which is provided with the externally profiled torque transmitting portion. Such pulley can further comprise at least one resilient element which directly or indirectly reacts against the member having the externally profiled portion or against the component of the mass and bears against the component of the mass or against the member having the externally profiled portion. The at least one resilient element can comprise a diaphragm spring acting in the direction of the common axis of the two members.

The aforementioned hub can be said to form part of that member which includes or constitutes a substantially radially outwardly extending flange of such hub. The flange may but need not be of one piece with the hub; if the flange is a separately produced part, the member including the flange and the hub further comprises means for connecting the hub with the flange. Such pulley can further comprise an adapter in the region of the connecting means between the flange and the hub. The means for connecting the flange with the hub can be disposed at a first radial distance from the common axis of the two members, and the flange can be provided with at least one projection which extends at least substantially in the direction of the common axis and is located at a greater second radial distance from the common axis. The other member of the pulley (e.g., the input member) can be engaged by a seal for the chamber, and such seal can further engage the hub of the member which includes the flange. The seal can comprise a membrane, e.g., a membrane which includes or constitutes a diaphragm spring. The diaphragm spring can consist, at least in part, of a suitable metallic material, e.g., stainless steel. It is also possible to employ a seal which consists, at least in part, of a plastic material, e.g., polyamide. The plastic seal can contain a reinforcing material, e.g., glass fibers.

One of the two members of the pulley can be connected with a rotary output element of a prime mover (e.g., with the camshaft or with the crankshaft of an internal combustion engine in a motor vehicle) , and such pulley can further comprise a closure which is carried by the other member and is connectable with the output element of the prime mover upon connection of such output element with the one member of the pulley. The other member of the pulley can include a section which is made of sheet metal, and such pulley can further comprise a connection between the closure and the sheet metal section. For example, the connection can be such that it enables the closure to be snapped onto the properly configured part or parts of the sheet metal section. Furthermore, the cover can include one or more parts which are configured to be engaged by an implement (e.g., a screw driver) serving to facilitate convenient separation of the cover from the respective member of the pulley.

The pulley can further comprise a flyweight. The flyweight can form part of one of the two members, e.g., of the aforementioned flange which is carried by a hub and can extend radially outwardly toward the inner side of the externally profiled torque transmitting portion of the other member.

As already mentioned above, one of the two members (such as the input member) of the pulley can be connected with a rotary output element of a prime mover. The output member of the improved pulley can be connected with a rotary input element of an auxiliary aggregate in a motor vehicle; such auxiliary aggregate can constitute, for example, a light generator (dynamo) or a pump or an air conditioning unit.

In accordance with one presently preferred embodiment of the improved pulley, certain parts of the pulley are spaced apart from the common axis of the two members in such a way that the aforementioned externally threaded torque transmitting portion of one of the two members is located at a maximum radial distance from the axis, that the bearing is disposed at a lesser second radial distance from the axis, and that the at least one energy storing element of the damper is disposed at a third radial distance from the axis, namely a distance less than the second distance. The mass can be disposed at a fourth radial distance from the axis, and such fourth radial distance is preferably less than the second distance but exceeds the third distance.

If the vibration damping device comprises one or more energy storing elements, such element or elements preferably acts or act in the circumferential direction of the two members and is or are disposed in the chamber.

The bearing, too, can be disposed in the aforementioned chamber.

If the damper comprises a plurality of energy storing elements, all such elements are preferably disposed in the chamber and are installed therein to act in the circumferential direction of the two members of the pulley. Analogously, if the vibration damping device comprises a plurality of energy storing elements, such elements are preferably installed in the chamber and act in the circumferential direction of the two members.

The at least one energy storing element of the damper can comprise a spring consisting, at least in part, of rubber or other suitable elastomeric material. It is also possible to employ an energy storing element which contains a metallic material; such energy storing element can comprise one or more coil springs.

Another feature of the invention resides in the provision of a pulley which comprises first and second members rotatable with and relative to each other about a common axis. One of these members is the input member and the other of these members is the output member of the pulley. At least the first member defines a chamber which extends at least substantially in a circumferential direction of the first member, and the pulley further comprises a bearing which is disposed between the first and second members and is installed in the chamber, and a damper which serves to yieldably oppose rotation of the two members relative to each other and includes at least one energy storing element acting in the circumferential direction of the first member and being disposed in the chamber. The output member is or can be provided with means for connecting it to a rotary part of an aggregate in a motor vehicle, e.g., an auxiliary aggregate such as the dynamo, the pump of a power steering system or an air conditioning unit.

A further feature of the invention resides in the provision of a pulley which comprises first and second members rotatable with and relative to each other about a common axis. One of these members is the input member and the other member is the output member of the pulley, and at least the first member defines a chamber which extends at least substantially in a circumferential direction of the two members. One of the two members includes an externally profiled torque transmitting portion (such profiled portion can transmit torque from the one member to one or more endless belts or chains or can receive torque from one or more belts or chains) which extending at least substantially in the direction of the common axis of the two members. The pulley further comprises a vibration damping device including a mass disposed in the chamber and at least one energy storing element disposed in the chamber and acting in the circumferential direction of the members. The output member of the pulley can be provided with means for connecting it to a rotary part of an auxiliary aggregate in a motor vehicle.

The novel features which are considered as characteristic of the invention are set forth in particular in the appended claims. The improved pulley itself, however, both as to its construction and the mode of assembling and utilizing the same, together with numerous additional features and advantages thereof, will be best understood upon perusal of the following detailed description of certain presently preferred specific embodiments with reference to the accompanying drawings.

DESCRIPTION OF PREFERRED EMBODIMENTS

Figure 1:
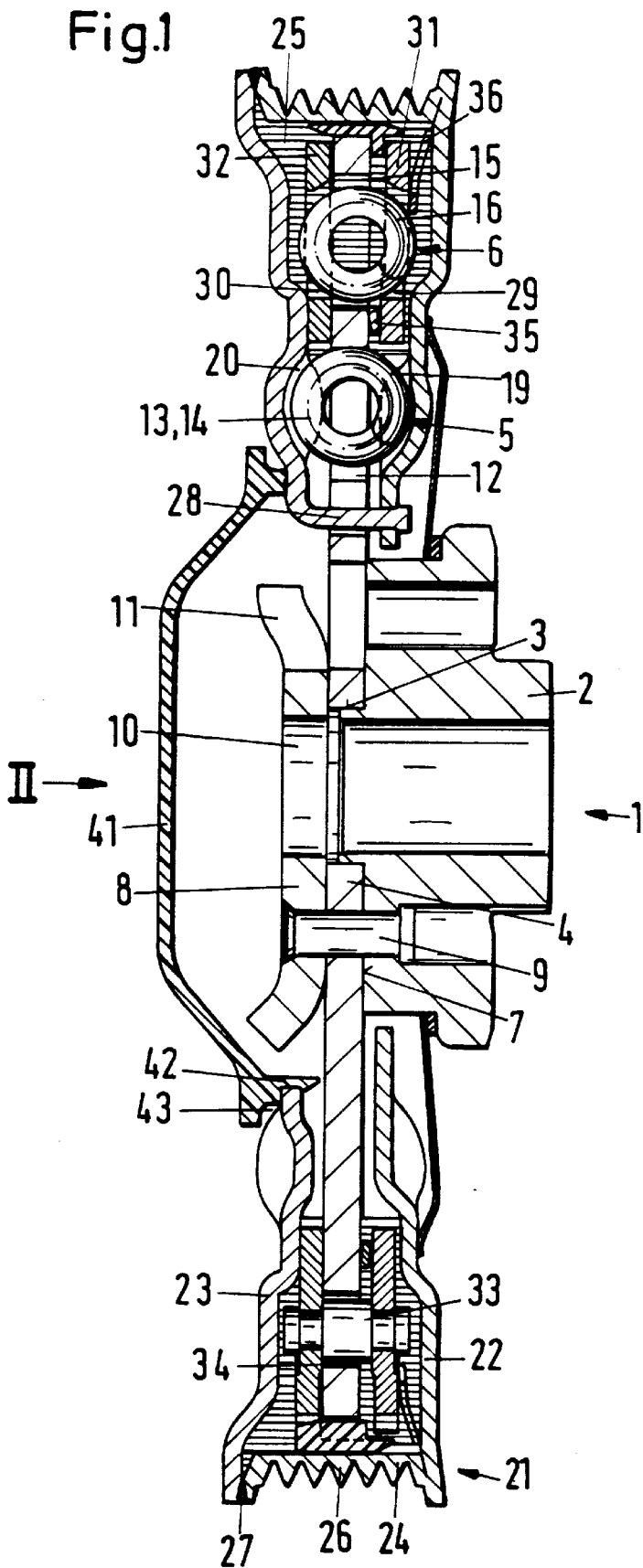
FIG. 1 is an axial sectional view of a pulley which embodies one form of the invention and comprises a vibration damping device.
Figure 2:
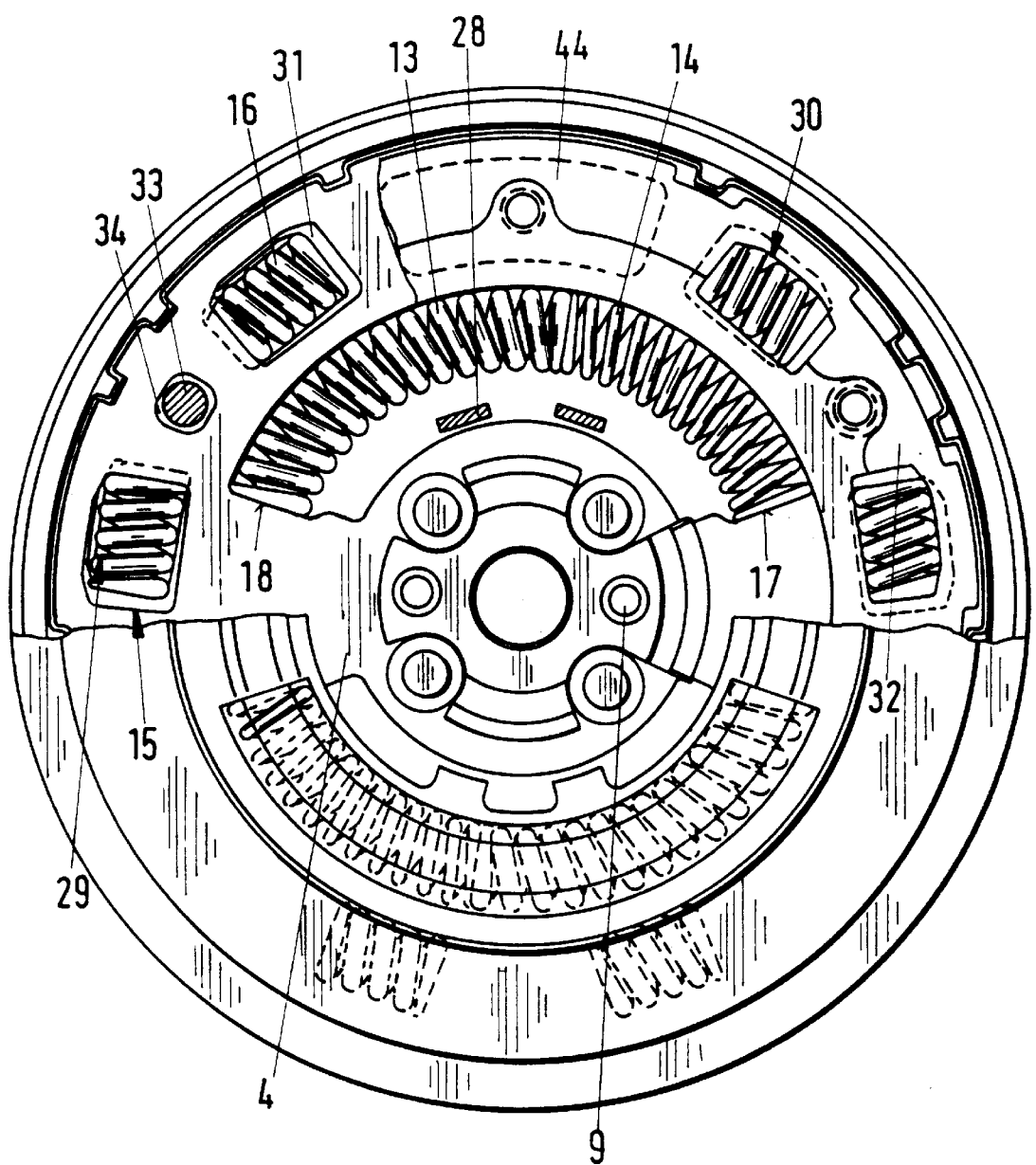
FIG. 2 is a smaller-scale end elevational view as seen in the direction of arrow II in FIG. 1, with certain parts of the pulley partly broken away.
Figure 3:
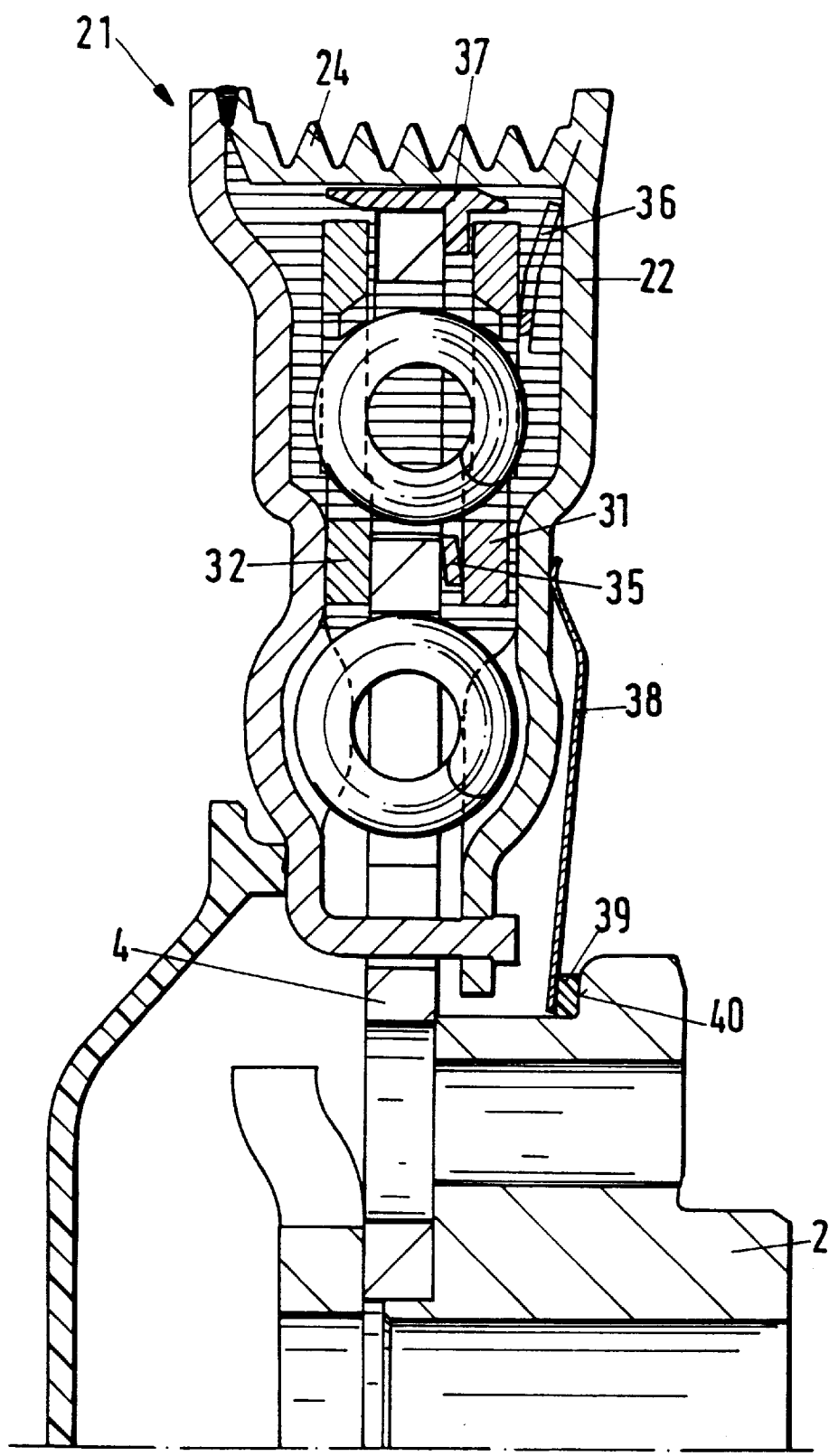
FIG. 3 is an enlarged view of the upper half of pulley which is shown in FIG. 1.

The pulley 1 which is shown in FIGS. 1, 2 and 3 is assumed to be intended to receive torque from a prime mover, such as an internal combustion engine in a motor vehicle, and to transmit torque to a rotary input element of an auxiliary aggregate of the vehicle, e.g., a pump forming part of a power steering system, a dynamo (light generator) and/or an air conditioning unit. The output element of the prime mover can transmit torque to a hub 2 which includes or carries a radially outwardly extending flange 4 forming part of or constituting the rotary input member of the pulley 1. Reference may be had, for example, to commonly owned U.S. Pat. No. 5,169,365 (granted Dec. 8, 1992 to Oswald Friedmann for "Power Train") which shows an engine having a rotary output element arranged to drive the hub of a pulley which, in turn, serves to drive another pulley by way of an endless flexible element, such as a chain. The disclosure of this patent is incorporated herein by reference.

Of course, the pulley 1 of FIGS. 1, 2 and 3 can be used with equal advantage to receive torque by way of an externally profiled radially outer portion 24 (such portion can be driven by one or more endless belts, chains, ropes or other flexible elements), and the hub 2 then serves to transmit torque to a shaft, e.g., a shaft forming part of or serving to transmit torque to an auxiliary aggregate (such as a generator) in a motor vehicle.

The substantially disc-shaped flange 4 is a separately produced part which surrounds an axially extending smaller-diameter end portion 3 of the hub 2 and can serve as an input member of the pulley 1 as well as an input element of a damper 5 which forms part of the pulley. The damper 5 serves to yieldably oppose rotation of the input member (flange 4) and an output member 21 of the pulley 1 relative to each other. The horizontal phantom line denotes in FIG. 1 the common rotational axis of the input and output members 4, 21. Still further, the flange 4 constitutes the rotary input element of a vibration damping or absorbing device 6 (hereinafter referred to as device or damping device) of the improved pulley 1.

The end portion 3 of the hub 2 centers the flange 4, and the latter centers the output member 21 relative to the common axis.

That side of the flange 4 which confronts the prime mover for the pulley 1 abuts a radially extending shoulder 7 of the hub 2; the other side of the flange 4 is engaged by an adapter 8 which can be made of a suitable metallic sheet material and urges the flange against the shoulder 7. To this end, the adapter 8 is affixed to the hub 2 by connecting or fastening means including a set of equidistant rivets 9. These rivets simultaneously serve as a means for non-rotatably affixing the flange 4 to the hub 2. Other fasteners (such as screws, bolts and nuts or the like) can be utilized with equal or similar advantage. Rivets are preferred at this time, especially if the flange 4 is relatively thin so that each rivet 9 can be anchored in the hub 2 and in the adapter 8 to thus cause the adapter to urge the flange 4 against the shoulder 7. FIG. 1 shows that the axial length of the end portion 3 is less than the thickness of the flange 4, i.e., the central portion of the adapter 8 need not abut the hub 2.

The adapter 8 has a central opening 10 for the output element of the prime mover, and several additional openings 11 (e.g., in the form of marginal recesses) which can receive the working ends of a suitable implement (not shown) serving to hold the input member (2, 4) of the pulley 1 in a predetermined angular position while the hub 2 is being non-rotatably secured to the rotary output element by a centrally located threaded connector (not shown in FIGS. 1, 2 and 3) or in any other suitable way. A suitable implement and a centrally located fastener will be described with reference to FIG. 4.

The flange 4 is provided with openings 12 in the form of windows which are located radially outwardly of the adapter 8 and serve to receive portions of energy storing elements 13, 14 forming part of the damper 5. The windows 12 are disposed radially inwardly of additional windows 15 also provided in the flange 4 and serving to receive portions of energy storing elements 16 of the device 6. As can be best seen in FIG. 2, the damper 5 of the pulley 1 comprises two pairs or groups of energy storing elements 13, 14; such groups are disposed diametrically opposite each other and constitute arcuate coil springs having different stiffnesses (rigidities) but the diameters of their convolutions are (or can be) identical. The coil springs 13, 14 of each pair or group are disposed end-to-end (as seen in the circumferential direction of the pulley 1, i.e., of the members 4, 21) and have identical radii of curvature. Thus, each spring 13 operates in series with the respective spring 14. The free end convolutions of the springs 13, 14 respectively engage abutments 17, 18 provided in the respective windows 12 of the flange 4, as well as abutments 19, 20 forming part of the output member 21. Thus, the coil springs 13, 14 are caused to store energy (or to store additional energy) when the members 4, 21 are caused to turn relative to each other from neutral positions in a clockwise direction or in a counter-clockwise direction. Furthermore, the springs 13, 14 cooperate with the abutments 17, 18 and 19, 20 to transmit torque between the input member 4 and the output member 21.

The output member 21 comprises two washer- or disc-shaped sections 22, 23 which consist of sheet metal, and the member 21 further comprises the aforementioned externally profiled torque transmitting portion 24 which extends in the direction of the common axis of the members 4, 21. The section 22 is of one piece with the portion 24 and the sections 22, 23 extend radially inwardly from the respective axial ends of the portion 24. The portion 24 is sealingly secured to the radially outermost portion of the section 23 by a circumferentially complete ringshaped welded seam 27. The external profile 26 of the portion 24 can include circumferentially extending ribs having a substantially V-shaped cross-sectional outline.

The output member 21 defines an annular chamber 25 which extends in the circumferential direction of the pulley 1 and is immediately adjacent the inner side of the externally profiled portion 24. The external profile with ribs 26 is particularly suitable for engagement with the complementary profile of an endless flexible belt (not shown) which can be made of a suitable plastic material (such as polyvinyl).

The continuous welded seam 27 can be replaced with an annulus of spot welds; however, a circumferentially complete seam is normally preferred because the chamber 25 should be capable of reliably confining a supply of viscous material (such as grease), and such viscous material gathers in the radially outermost portion of the chamber 25 under the action of centrifugal force. A presently preferred method of making the continuous seam 27 includes laser welding. Such mode of sealing the radially outermost portion of the chamber 25 renders it possible to establish a reliable seal without resorting to separately produced sealing elements.

If the sections 22, 23 of the output member 21 are made of a metallic sheet material, the aforementioned abutments 19, 20 for the coil springs 13, 14 can constitute suitably deformed portions of such sections. One can resort to a stamping, embossing or other suitable sheet metal deforming technique. However, it is equally within the purview of the invention to employ separately produced abutments 19, 20 which are thereupon welded, riveted or otherwise secured to selected portions of the sections 22, 23. The making of the abutments 19, 20 as separate parts is or can be advisable and advantageous if the sections 22, 23 of the output member 21 are not readily deformable, e.g., if the entire member 21 or a portion of this member is a casting.

The output member 21 further comprises distancing elements 28 which serve to secure or connect the sections 22, 23 to each other radially inwardly of the springs 13, 14 of the damper 5. This ensures that the width of the radially inner portion of the chamber 25 (as considered in a direction radially of the common axis of the members 4, 21) remains unchanged. The illustrated distancing elements 28 are of one piece with the section 23 of the member 21 and constitute or resemble lugs which extend at least substantially in parallelism with the common axis. As can be seen in FIGS. 1 and 3, the distancing elements 28 extend through the flange 4, namely through the radially inner portions of the windows 12 for the coil springs 13, 14 of the damper 5. The free ends of the distancing elements 28 extend through holes in the adjacent portions of the section 22, and such free ends are plastically deformed (e.g., upset) to constitute or to act not unlike rivet heads which establish a reliable force-locking or form-locking connection between the radially inner portions of the sections 22, 23.

It is clear that the illustrated distancing elements 28 can be replaced with separately produced distancing elements in the form of rivets, bolts and nuts, screws and/or others.

The distancing elements 28 (or their equivalents) can also serve as stops which limit the extent of angular movability of the members 4, 21 relative to each other. All that is necessary is to properly select the dimensions (in the circumferential direction of the pulley 1) of those portions of the windows 12 which receive portions of the distancing elements 28.

The device 6 is installed in the chamber 25 (the same as the coil springs 13, 14) radially outwardly of the damper 5, namely radially outwardly of the springs 13, 14. The illustrated device 6 comprises energy storing elements 16 in the form of coil springs which are made of a suitable metallic material. Central portions of the coil springs 16 are received in the windows 15 of the flange 4, and these springs further extend into openings or windows 29, 30 respectively provided in sheet metal components 31, 32 together constituting the mass of the device 6 and flanking the flange 4.

As can be seen in FIG. 2, the windows 15 of the flange 4 are not in exact alignment or register with the windows 29, 30 of the components 31, 32. This renders it possible to install the coil springs 16 in prestressed condition so that the prestressed springs 16 oppose the bias of the springs 13, 14, as seen in the circumferential direction of the members 4, 21. It will be seen that the mass including the components 31, 32 of the device 6 actually "floats" between the coil springs 16 which is desirable and advantageous because the device 6 can operate without play, i.e., there is no abrupt change of torque when the mass including the components 31, 32 leaves its neutral or zero position in response to an angular displacement of the members 4, 21 relative to each other in either direction. Of course, and since such mounting of the coil springs 16 entails an addition (summing) of their spring constants, the characteristic curve of the composite resilient element including the coil springs 16 is relatively steep.

The components 31, 32 are connected with each other by distancing elements or spacers 33 in the form of stepped rivets extending through the flange 4 in parallelism with the common axis of the flange 4 and member 21. The distancing elements 33 can further serve as a means for limiting the extent of angular movability of the mass 31, 32 and the flange 4 relative to each other. All that is necessary is to properly select the dimensions of the openings 34 (as seen in the circumferential direction of the components 31, 32) which are provided in the flange 4 and through which the maximum-diameter median portions of the distancing elements 33 extend.

The pulley 1 further comprises a resilient element 35 in the form of a diaphragm spring which acts in the axial direction of the flange 4 and member 21. The spring 35 reacts against the flange 4 and bears against the component 31 so that the latter is urged axially and away from the flange. This causes the distancing elements 33 to urge the component 32 axially toward and against the respective side of the flange 4 (either into full or into partial face-to-face contact). Thus, the flange 4, the component 32 and the diaphragm spring 35 can be said to constitute a friction generating device. The frictional force (hysteresis) which is generated by the parts 4, 32, 35 is effective when the mass 31, 32 of the device 6 and the flange 4 are caused to turn relative to each other, and such force operates in parallel with the bias (force) of the coil springs 16 which act in the circumferential direction of the pulley 1. The diaphragm spring 35 further serves as a means for maintaining the device 6 in a predetermined axial position relative to the input member because this spring causes the flange 4 and the component 32 to remain in at least partial face-to-face contact with each other.

A further axially acting resilient element 36 in the form of a diaphragm spring is installed radially outwardly of the coil springs 16; this diaphragm spring acts against the component 31 and biases the section 22 of the member 21 axially and away from the flange 4 to thus ensure that the member 21 can "float" in the direction of the common axis of the flange 4 and output member 21 against the opposition or resistance of the diaphragm spring 36. Such mounting of the member 21 is desirable and advantageous because it can compensate for eventual misalignment of various disc-shaped parts of the pulley 1 relative to each other.

Still further, the diaphragm spring 36 cooperates with the component 32 and with the section 23 to generate a frictional force acting between the parts 23, 32 in parallel at least with the forces generated by the coil springs 13, 14 of the damper 5 and acting in the circumferential direction of the pulley 1. It will be seen that the spring 36 is designed to establish a basic frictional force for the damper 5 as well as a basic frictional force for the device 6.

The pulley further comprises a friction bearing 37 which is located between the internal surface of the externally profiled portion 24 of the section 22 forming part of the output member 21 and the adjacent radially outermost portion of the flange (input member) 4. The illustrated bearing 37 is a ring consisting of a suitable synthetic plastic material which is non-rotatably carried by the flange 4 and is in sliding contact with the portion 24 of the section 22.

The reference character 38 denotes a membrane which constitutes or acts as a diaphragm spring and forms part of a sealing means for the chamber 25. The radially outermost portion of the membrane bears against the outer side of the section 22 of the output member 21, and its radially inner portion acts upon an annular sealing element 39 engaging a radially extending external shoulder 40 of the hub 2. The membrane 38 confronts the prime mover when the output element of such prime mover is properly affixed to the hub 2. The sealing element 39 can be made of a suitable plastic material. It is not always necessary that the sealing means including the membrane 38 and the element 39 be designed to prevent the (unlikely) escape of viscous material (such as grease) from the chamber 25; it normally suffices if the parts 38, 39 serve as a means for preventing, or for at least reducing the likelihood of, the penetration of water or another liquid and/or dust and other solid contaminants into the chamber 25.

A cover, lid or an analogous closure 41 for the adapter 8 and its opening 10 is provided at that side of the output member 21 (i.e., at the exposed side of the section 23) which faces away from the prime mover. This cover 41 is preferably separably coupled (e.g., by snap action) to the section 23 upon completion of the establishment of a torque transmitting connection between the output element of the prime mover and the flange 4. The illustrated cover 41 has fingers 42 which are preferably resilient and can engage the adjacent radially inner portion of the section 23 by snap action. Furthermore, the cover 41 and/or the section 23 is preferably provided with suitably configured (e.g., recessed) portions 43 which can be engaged by one or more implements (such as screw drivers, levers or the like) serving to detach the cover 41 from the output member 21 (if and when necessary). The portions 43 are or can be adjacent the fingers 42 (as seen in the circumferential direction of the pulley 1). It is clear that the fingers 42 and the portions 43 constitute but one form of means for releasably coupling the cover 41 to the section 23.

Figure 1A:
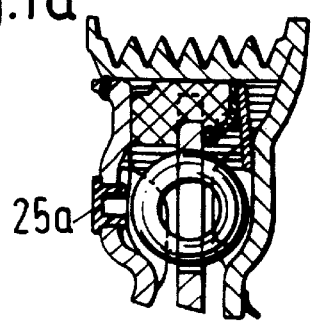
FIG. 1a is a fragmentary axial sectional view showing a modification of the pulley, of FIG. 1.

The chamber 25 of the output member 21 has a practically or substantially open radially inner portion and a fully sealed radially outer portion. Such design of the member 21 renders it possible to introduce the viscous material into the chamber 25 upon completed assembly of the pulley 1. However, it is also possible to introduce a desired quantity of viscous material into the chamber 25 before the output member 21 is assembled with the flange 4 or even prior to the making of the welded seam 27. Still further, and as shown in FIG. 1a, it is possible to provide the output member 21 with at least one inlet which communicates with the chamber 25 (e.g., at the radial level of the coil springs 16) and can be sealed by a suitable stopper 25a, such as a plug made of a plastic material. The means for admitting viscous material through the inlet of the chamber 25 can include a grease gun or the like. The stopper 25a can be omitted if the inlet to the chamber 25 is sealed by a welded seam subsequent to the introduction of a requisite quantity of viscous material into the chamber.

Irrespective of the selected mode of introducing viscous material into the chamber 25 and of thereupon sealing (if necessary) the inlet or inlets for admission of such viscous material, it is advisable to rotate the assembled pulley 1 at a high speed prior to mounting of the hub 2 on the output element of a prime mover or on another rotary element (e.g., the shaft of an auxiliary aggregate). This ensures a desirable uniform distribution of viscous material in the chamber 25, particularly in the radially outer portion of the chamber if the selected quantity of viscous material is less than that which is needed to completely or nearly completely fill the chamber. If the chamber 25 is to be only partially filled, the quantity of viscous material is preferably selected in such a way that, when the uniform distribution of the selected quantity of viscous material in the chamber 25 is completed, at least the radially outer halves of the coil springs 13, 14 dip into (i.e., are immersed in) the uniformly distributed viscous material. Such selection of the quantity of viscous material (e.g., to the level of the arcuate axes of the coil springs 13, 14) is desirable and advantageous because it reduces the likelihood of noise generation. Furthermore, an at least partial immersion of the coil springs 13, 14 into the uniformly distributed viscous material ensures proper lubrication of, and reduces the likelihood of pronounced wear upon, those surfaces of the end convolutions of the coil springs 13 and the neighboring coil springs 14 which are in contact with each other.

The pulley 1 further comprises a flyweight (unbalance) which is constituted by the flange 4. To this end, the flange 4 is provided with an opening, cutout or recess 44 (see FIG. 2) which is shown as being disposed between two coil springs 16 as seen in the circumferential direction of the pulley 1. Such flyweight is provided to compensate for the imbalance caused by the output element which drives the hub 2 if such output element is or includes a crankshaft of a combustion engine.

The placing of the mass including the parts 31, 32 close to and radially inwardly of the profiled portion 24 of the section 22 exhibits several advantages as concerns the compactness of the pulley and the effectiveness (moment of inertia) of the device 6.

It is often desirable to employ a damping unit (not shown) which connects the mass of the device 6 with the shaft serving to drive the flange 4.

An advantage of a device 6 which employs energy storing elements 16 in the form of metallic coil springs (such as steel springs) over a vibration damping device which operates with energy storing elements made of rubber or another elastomeric material is that the characteristic frequency of the device 6 is practically independent of the temperature and/or aging. Such characteristic frequency can be selected with a high degree of accuracy and remains unchanged during the entire useful life of the device 6; this, in turn, renders it possible to select and conform the mass moment of inertia of the components 31, 32 much more reliably and accurately than with a vibration damping device employing elastomeric energy storing elements.

Still another advantage of the illustrated device 6 is that it is possible to greatly increase the so-called angle of oscillation which, in turn, renders it possible to reduce the mass, the mass moment of inertia and the space requirements of such device. This is in contrast with the vibration damping devices which employ an elastomeric track because the thickness of such track limits the magnitude of the aforementioned angle of oscillation. The size of such angle is further limited by internal friction and the resulting heating of an elastomeric track.

The radial dimensions of the windows in one of the components 31, 32 can exceed those of the windows in the other of these components. This renders it possible to insert the energy storing elements 16 subsequent to completed assembly of the mass including the components 31, 32 and the distancing elements 33. The energy storing elements 16 can be inserted from within (in a direction substantially radially outwardly) at an oblique angle to the axis of the pulley 1. The thus inserted energy storing elements 16 are urged radially outwardly by centrifugal force so that they are unlikely to leave their optimum positions relative to the components 31, 32 of the mass of the device 6.

By utilizing a damper 5 with groups or sets of coil springs 13, 14 having different rigidities (stiffnesses), one can obtain a two-stage characteristic curve including a first stage having a very low spring rate (e.g., less than 1 Nm/°) and an angular displacement of between about 15° and 20°, and a second stage having a spring rate and an angular displacement conforming to the maximum developing or to the maximum anticipated torque. Such characteristic curve with a very flat first stage ensures that the pulley or a drive utilizing such pulley can operate within the supercritical range when the RPM matches the starter RPM, i.e., in response to starting (ignition) of the combustion engine in a motor vehicle, namely within the ultraresonance range (above the natural frequency). This contributes to a more satisfactory starting as concerns the generation of noise and the wear. For example, the so-called screeching or creaking noise can be eliminated or reduced to an insignificant level.

The feature that energy storing elements (13, 14) having different stiffnesses can be installed end-to-end in a common window (12) is of advantage in the damper 5 of the improved pulley 1 as well as in many other types of torsional vibration dampers. For example, this feature can be employed in the dampers of clutch discs or clutch plates forming part of friction clutches, and in composite flywheels wherein two flywheels or masses can turn relative to each other against the resistance of a torsional vibration damper. Reference may be had to numerous United States and foreign patents owned by the assignee of the present application and dealing with clutch discs, friction clutches and twin-mass flywheels, all employing torsional vibration dampers between parts which can be rotated relative to each other.

It has been ascertained that, when the energy storing elements 13, 14 of the damper 5 are elongated arcuate coil springs having a length several times the diameter of a convolution and directly abutting each other end-to-end, the spring (see the spring 14) which is made of a wire having a diameter less than the wire diameter of the other spring (13) abuts the flange 4 in the preferred direction of the application of load (pull) whereas the other spring (13) abuts the components 31, 32 of the mass of the device 6, this entails that the spring 14 abuts a part (flange 4) which is normally made of a hardened metallic material, such as high-quality steel. It is also advisable to provide the free end convolutions of each coil spring 13 with flattened (e..g, ground) surfaces abutting the adjacent part (as at 18) because such shaping of the free end convolutions reduces the likelihood of undesirable tilting or other misalignment of such springs in actual use of the damper 5. The reduction of cross-section which develops as a result of such shaping (flattening) of the free end convolutions of the springs 13 (especially in the region nearer to the axis of the flange 4) is of no consequence, even when each spring 13 is fully compressed so that the radially inner portions of its convolutions actually abut each other, i.e., when the springs 13 act as solid bodies, because the diameter of the wire of which the springs 13 are made is relatively large. The flattening of the free end convolutions of the coil springs 13 renders it necessary to conform the abutments (18) for such end convolutions accordingly so that the flattened end convolutions can properly engage such abutments when the springs 13 are stressed in a direction counter to the preferred direction, namely in the coasting direction. The configuration and the inclination of each abutment 18 are preferably such that these abutments can be properly (uniformly) engaged by the radially inner as well as by the radially outer portions of the adjacent free end convolutions of the coil springs 13 when these springs are stressed in a direction (coasting) counter to the preferred direction (pull).

The provision of abutments 19, 20 which are of one piece with the output member 21 and are engaged by the coil springs 13, 14 of the damper 5 exhibits the advantage that the cost of making the damper 5 and the entire pulley 1 is reduced accordingly. As already mentioned above, the abutments 19, 20 can constitute suitably upset, displaced and/or otherwise deformed portions (e.g., axially extending pockets) of the sections 22 and 23.

It is often preferred to provide the chamber 25 in the output member 21 of the improved pulley 1, i.e., in that member which includes the externally profiled torque transmitting portion 24 adapted to be engaged by one or more endless chains, belts or the like.

An advantage of the feature that the chamber 25 is at least partially filled with a viscous material is that the bearing 37 between the output member 21 and the flange 4 can constitute a simple and inexpensive friction bearing. The angular movements which are carried out by the parts of the device 6 are relatively small which is conducive to rusting; however, the likelihood of such rusting is at least reduced by the viscous material in the chamber 25. In addition, the viscous material acts as a lubricant for the coil springs 13, 14 and 16, even if certain springs (such as the springs 13, 14) are not fully immersed in the viscous material. Still further, the viscous material in the chamber 25 acts as a noise suppressing medium. The radially inner portion of the chamber 25 can remain at least partially open because the characteristics of the viscous material can be readily selected in such a way that it is not likely to escape radially inwardly; furthermore, this entails considerable savings because one can dispense with separate inlet(s) for the introduction of viscous material and with the stopper(s) (such as 25a) for the inlet or inlets.

The distancing elements 28 constitute an optional but desirable feature of the output member 21 because they greatly reduce the likelihood of an axial expansion of the radially inner portion of the chamber 25 (i.e., of that portion which is located radially inwardly of the device 6 and radially outwardly of the coil springs 13, 14). In the absence of the distancing elements 28, the radially inner portion of the chamber 25 could expand axially of the output member 21 in response to the pressure of the confined viscous material.

An advantage of the feature that the friction bearing 37 is adjacent the inner side of the profiled portion 24 is that the bearing is immersed in the viscous material. This ensures that, when the pulley 1 is driven within the normal (expected) range of rotational speeds of the engine, the bearing "floats" which is to say that the bearing operates within a range with liquid friction. This entails a reduction of friction between the output member 21 and the flange 4 and further ensures that the friction-induced wear upon the bearing 37 is minimal. Moreover, the absence of pronounced basic friction brings about a highly satisfactory isolation of vibrations because, at such time, the operation of the pulley is supercritical, i.e., within a range when each and every amount of friction would entail a less satisfactory insulation of vibrations. The aforementioned "floating" of the bearing 37 is limited within the start/stop range, namely when the engine is started or turned off; at such time, the aforediscussed liquid friction is replaced by the so-called mixed friction. This entails an increase of the basic friction which, in turn, brings about a desirable damping or suppression of resonant vibrations which tend to develop during such stage of operation. All in all, the combination of viscous material and friction bearing 37 at the inner side of the profiled portion 24 renders the transition of resonances less critical, for example, as concerns a reduction of the wear and/or a reduction of noise.

The selection of the material for the friction bearing 37 will depend upon the space which is available for the bearing in the chamber 25. As a rule, or at least in many instances, the bearing 37 will be made of steel or of a synthetic plastic material (such as polyamide known as PA 6.6). A plastic bearing can be reinforced, for example, with glass fibers. In accordance with a presently preferred embodiment, the reinforcing material can constitute about 30% of the material of the bearing; this optimizes the resistance of the bearing to wear as a result of continuous frictional engagement with the portion 24 of the member 21.

As already mentioned above, the bearing 37 can be extruded onto or otherwise permanently bonded to the flange 4. This can be carried out in the following way: The flange 4 is placed into a mold which is designed to provide room for the injection of a requisite quantity of plastic material which is to form the ring-shaped friction bearing 37. An analogous procedure can be resorted to if the bearing 37 is to be made of a non-plastic material, e.g., a sintered metal. The application of a plastic or other bearing 37 directly to the radially outer portion of the flange 4 can further serve to compensate for eventual tolerances in the making of the flange, i.e., the flange can be mass-produced with a lesser degree of precision because eventual tolerances can be compensated for during the making and the application of the bearing 37. This can bring about substantial savings in connection with the making of the flange 4.

The provision of resilient means (35 and/or 36) acting in the axial direction of the pulley 1 brings about the aforediscussed important advantages, i.e., the entire pulley can "float" in the axial direction to thus compensate for eventual tolerances including inaccurate alignment of cooperating pulleys which are connected to each other by one or more endless flexible chains, belts or the like. This reduces the likelihood of extensive or excessive or premature wear upon the belts or chains, especially along the edges of such flexible elements.

The axially acting springs 35 and 36 further serve to ensure the development of a basic (minimal) friction between certain abutting parts of the damper 5 as well as between certain abutting parts of the device 6. The basic frictional force which is caused to develop under the bias of the diaphragm spring 35, when the RPM of the pulley 1 is relatively low, operates in parallel with the force of the arcuate coil springs 13, 14 of the damper 5. It is true that this necessitates a certain amount of axial movability of the flange 4 and the component 31 relative to each other; however, this is of no consequence because, when the damper 5 is in use at a relatively low RPM, the device 6 acts not unlike a rigid body, i.e., the components 31, 32 of the device 6 then rotate in synchronism with the flange 4. On the other hand, when the RPM of the pulley 1 is high, the damper 5 is inactive, i.e., the phases and amplitudes of movement of the flange 4 and output member 21 are practically identical; at such time, the device 6 (which is attuned to the characteristic frequency of the crankshaft of the engine) then oscillates relative to the flange 4 as well as relative to the output member 21 and its chamber 25. Consequently, the diaphragm spring 35 establishes the basic friction for the device 6, not only at the parts (4, 31) which are in direct contact therewith but also in the region of contact between the component (32) and the section of wall (23) at the opposite side of the flange 4.

It is presently preferred to install the resilient element 35 between that section (22) of the member 21 which carries the profiled portion 24 and the adjacent component (31) of the mass of the device 6.

The purpose of the adapter 8 is to facilitate temporary retention of the hub 2 in an optimum angular position during mounting of the hub on the output element of a prime mover or on another rotary part, e.g., on a shaft forming part of an auxiliary aggregate in a motor vehicle. A number of suitable implements (e.g., wrenches) are available or can be designed to hold the adapter 8 (and hence the hub 2 and its flange 4) in a desired angular position while the cover or closure 41 is still detached from the section 23 of the member 21 and the hub is in the process of being threadedly or otherwise non-rotatably secured to a shaft or the like. For example, the means for securing the hub 2 to a shaft can include a centrally located scew or bolt.

The sealing means including the membrane 38 and the annular sealing element 39 can perform the aforediscussed function of sealing the chamber 25 against the escape of viscous material and/or the function of at least reducing the likelihood of penetration of solid and/or liquid contaminants into the chamber. Furthermore, the parts 38, 39 can serve as a means for actually repelling the adjacent solid and/or liquid contaminants when the member 21 and the hub 2 rotate. Stainless steel is one of the presently preferred materials of the membrane 38. The sealing element 39 can be made of the same plastic material (PA 6.6) as the friction bearing 37. This brings about additional savings. If the membrane 38 and the section 22 are made of steel, friction between these parts is that of steel against steel; on the other hand, friction at the radially inner portion of the membrane 38 is that between steel and a plastic material (membrane against the sealing element 39 and/or the sealing element 39 against the shoulder 40 of the hub 2). Consequently, the membrane 38 is much less likely to slide relative to the section 22 than relative to the sealing element 39; this is desirable because it reduces the likelihood of rusting as a result of rubbing of steel against steel while the respective parts (22, 38) move relative to each other. The sealing element 39 can be reinforced by glass fibers or the like to prolong its useful life. Reinforcement with glass fibers promotes the wear upon the adjacent radially inner portion of the membrane 38 due to the abrasive action of glass fibers upon steel, i.e., upon the presently preferred material of the membrane.

The closure or cover 41 constitutes an optional but desirable part of the pulley 1. The main function of the part 41 is to reduce the likelihood of penetration of foreign matter into the damper 5, i.e., to prevent a contamination of the pulley from within. In addition, the closure or cover 41 has been found to contribute to a reduction of noise. It is presently preferred to make the part 41 of a suitable plastic material, for example, from PA 6.6 in an injection molding or extruding machine. If desired, the plastic part 41 can be reinforced with glass fibers or the like.

The exact configuration of the recessed portions 43 of the cover or closure 41 will depend upon the nature of the implement (such as a wrench, a lever or a screw driver) which is to be utilized To deform the preferably elastic projections 42 in order to separate the part 41 from the section 23 of the output member 21.

If the pulley 1 is used for the transmission of torque to a rotary input element (e.g., a shaft) of an auxiliary aggregate, such as a light generator in a motor vehicle, the generator can be automatically uncoupled from the engine when the RPM exceeds a given value (e.g., above 500 RPM with reference to the engine). This can bring about several advantages including a smooth operation of the drive employing the improved pulley and smoother operation of the light generator. Therefore, the wear upon and the useful life of the belt(s), chain(s) or other torque transmitting flexible element(s) can be reduced and the useful life of such part(s) can be prolonged, and the same holds true for the auxiliary aggregate(s) which is or which are driven by the pulley. Furthermore, the improved pulley enhances the comfort to the occupant(s) of the motor vehicle because it reduces the likelihood of the development of readily detectable noise and/or vibrations which cannot be adequately reduced by resorting to conventional pulleys.

It is further within the purview of the present invention to dispense with the viscous material. This contributes to lower cost of the pulley because the means (such as the welded seam 27) for sealing the chamber 25 against the escape of viscous material can be omitted. It is then advisable to employ a friction bearing which is made of a special material exhibiting desirable selflubricating properties, i.e., a material which can stand long periods of rubbing contact and wear without lubrication from the outside.

It is also possible to greatly reduce the wear upon the energy storing elements 16 of the device 6 and/or upon the energy storing elements 13, 14 of the damper 5, e.g., by properly configurating and dimensioning the abutments for such energy storing elements in the flange 4, in the sections 22, 23 of the output member 21 and/or in the flange 4 and the components 31, 32. For example, the abutments can be dimensioned and configurated to ensure a large-area contact with the adjacent convolutions of the energy storing elements. It is possible to install the energy storing elements (or the groups of energy storing elements) in suitable cages which are form-lockingly connected to the flange 4 or to the output member 21. The cage or cages can be made, for example, of steel or from a suitable plastic material.

An optimal axial positioning of the hub 2 relative to the other parts of the pulley 1 can be ensured by resorting to the aforementioned cage or cages for the energy storing elements or by resorting to additional positioning means, e.g., a disc or the like.

The damper 5 and/or the device 6 can comprise one or more energy storing elements, for example, at least one group of metallic springs or elastomeric springs (depending upon the intended use of the pulley) disposed end-to-end in the circumferential direction of the input and output members of the pulley. If the energy storing elements are metallic springs, they preferably constitute coil springs.

Reference may also be had to the disclosures of commonly owned published German Patent applications Nos. 44 20 178 and 44 34 324, as well as to corresponding patents and patent applications filed in countries other than Federal Republic Germany. To the extent which is necessary and/or permissible, the disclosures of such patents and applications are incorporated herein by reference.

Figure 4:
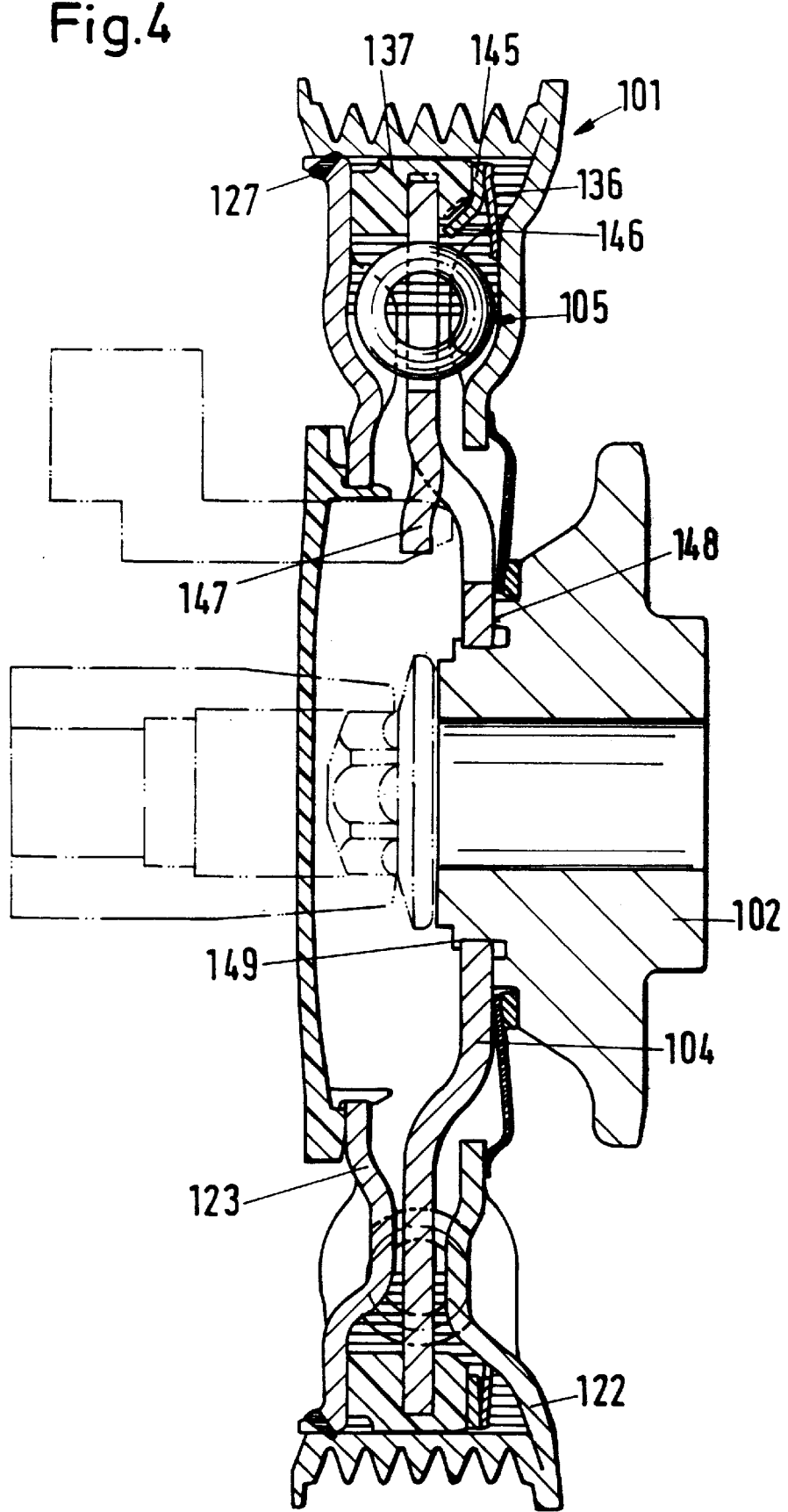
FIG. 4 is an axial sectional view of a pulley which does not employ a vibration damping device in the chamber for the damper serving to oppose rotation of the input and output members of the pulley relative to each other.
Figure 5:
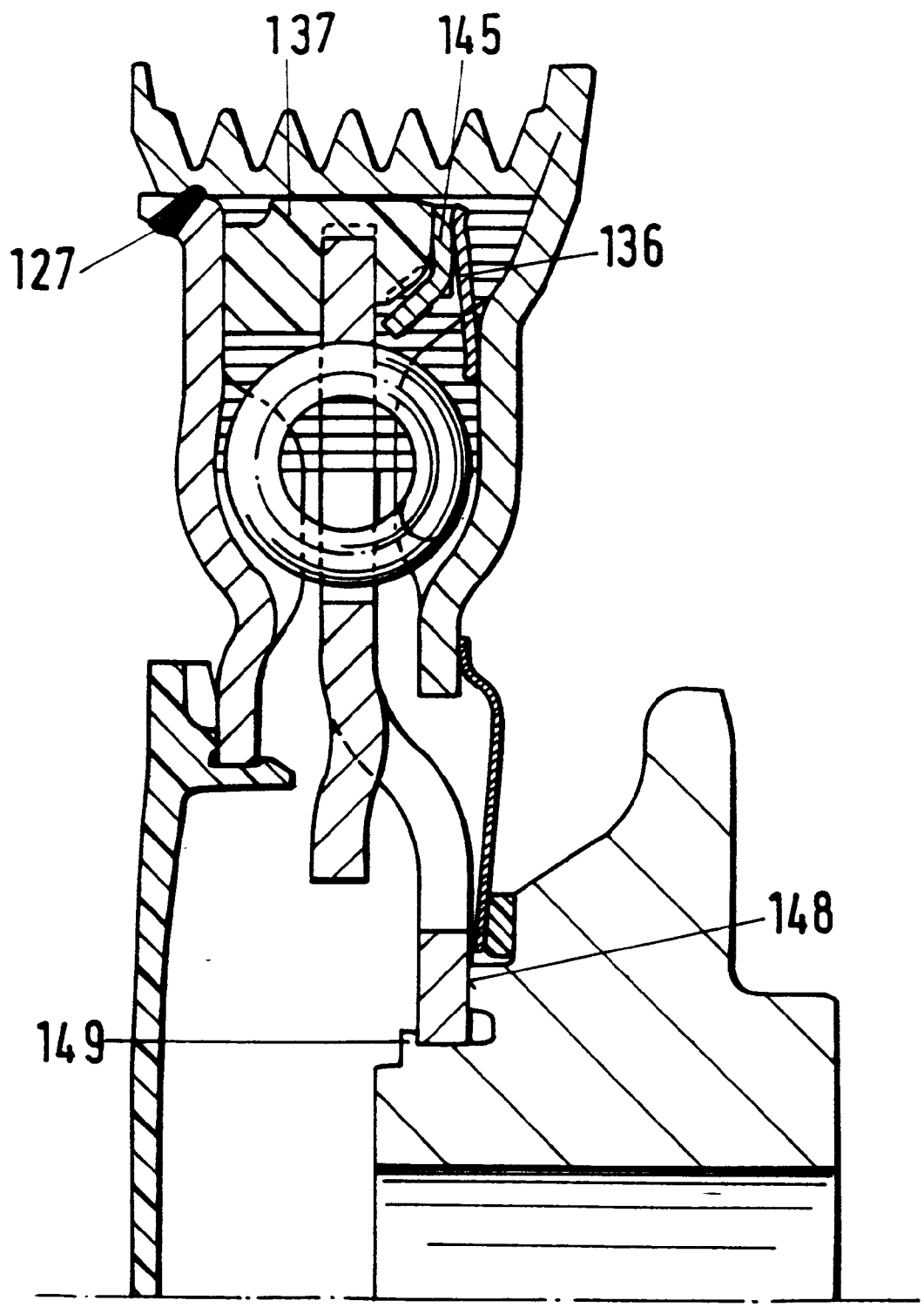
FIG. 5 is an enlarged view of the upper half of the pulley which is shown in FIG. 4.

FIGS. 4 and 5 show a modified pulley 101 wherein the chamber of an input or output member including the sections 122, 123 confines the coil springs of a damper 105 and a friction bearing 137. This pulley does not employ a vibration damping device. A friction generating device including a disc 145 is provided in the chamber adjacent the axially parallel externally profiled torque transmitting portion of the section 122. The device including the disc 145 operates in parallel with the damper 105 and further includes an axially stressed resilient element 136 in the form of a diaphragm spring, and the friction bearing 137. The radially inner portion of the diaphragm spring 136 reacts against the disc-shaped radial wall of the section 122, and its radially outer portion urges the disc 145 against the bearing 137 which is affixed to and rotates with the radially outer portion of the flange 104. This causes the bearing 137 to frictionally engage the section 123 radially inwardly of the welded seam 127. Thus, and since the bearing 137 shares the angular movements of the flange 104, any angular movements of the flange 104 and of the sections 122, 123 relative to each other result in the generation of a frictional force (hysteresis) acting in parallel with the bias of the springs forming part of the damper 105. The friction generating device is designed to produce a stepped hysteresis; to this end, the disc 145 includes projections 146 cooperating with complementary projections of the bearing 137. The projections 146 and the complementary projections of the bearing 137 are or can be designed in such a way that an increased or an additional frictional force develops subsequent to a predetermined angular displacement of the flange 104 and the member including the sections 122, 123 relative to one another.

The utilization of a multistage friction generating device is not limited to the improved pulley 101, i.e., such friction generating device can also be resorted to in other types of pulleys, e.g., in the pulley of FIGS. 1, 2 and 3 and/or in one or more pulleys shown in FIGS. 6 to 9.

A difference between the welded seams 27 and 127 is that the latter extends through (rather than at) the radially outer portion of the section 123 of the pulley 101. Thus, the section 123 can be inserted into and held by the adjacent axial end of the externally profiled portion of the section 122 preparatory to and during the making of the seam 127, e.g., by resorting to a laser welding machine. The welded seam 127 extends through the section 123 at an oblique angle to the common axis of the flange 104 and the section 122, namely radially outwardly from the exposed side of the section 123 toward and into the inner side of the externally profiled portion so that the seam resembles the frustum of a cone.

The flange 104 is provided with substantially radially inwardly extending projections or tongues 147 which replace the adapter 8 of the pulley 1, i.e., such projections can be engaged by one or more suitable implements (one indicated in FIG. 4 by phantom lines) to hold the flange 104 and the hub 102 in a predetermined angular position during attachment of the hub to a shaft or another rotary torque receiving or torque transmitting element. The projections or tongues 147 are disposed radially inwardly of the coil springs of the damper 105. The means for non-rotatably securing the hub 102 (i.e., the flange 104) to a rotary element can include a centrally located threaded fastener (indicated in FIG. 4 by phantom lines).

An advantage of the projections 147 is that the entire adapter 8 of the pulley 1 can be omitted, i.e., the function of such adapter can be carried out by the radially inner portion of the flange 104. This brings about savings in space as well as in manufacturing and assembly costs.

Additional savings are achieved in that the flange 104 is secured directly to the hub 102 so that the rivets 9 of the pulley 1 can be omitted. Thus, the flange 104 can be a press fit on the suitably configurated smallerdiameter axial extension of the hub 102 so that the flange abuts an annular stop 148 of the hub. The reference character 149 denotes one of preferably several plastically deformed portions of the hub 102 which hold the parts 102, 104 against axial and angular movement relative to each other. For example, the portions 149 can be formed by resorting to calking or another suitable deforming procedure.

An advantage of the welded seam 127 is that it ensures the establishment of a highly reliable seal between the sections 122, 123 such as is highly unlikely to permit any leakage of viscous material (if such viscous material is used) from the radially outer portion of the chamber between the section 123 and the radially extending wall of the section 122. In addition, the seam 127 reduces the quantity of heat which can be transmitted from the section 123 to the externally profiled portion of the section 122; this reduces the likelihood of heat-induced distortion of the section 122 and its externally profiled portion. Still further, the seam 127 can establish a reliable sealing connection even if the radially outer portion of the section 123 is not a highly accurate fit in the adjacent axial end of the externally profiled portion of the section 122. This reduces the cost of the member including the sections 122, 123 because the interfitted parts of these sections need not be machined and/or otherwise finished with a high degree of precision; such lack of precision finish does not affect the sealing action of the seam 127. The flange 104 can be designed to include a cupped or similar portion which centers the aforementioned implement or implements so that the latter can readily, rapidly and reliably engage the projections 147 in order to temporarily hold the flange 104 and the hub 102 in a selected angular position. For example, the implement or implements can be provided with teeth or analogous configurations which mate with the projections 147 and alternate therewith in the circumferential direction of the flange 104.

Figure 6:
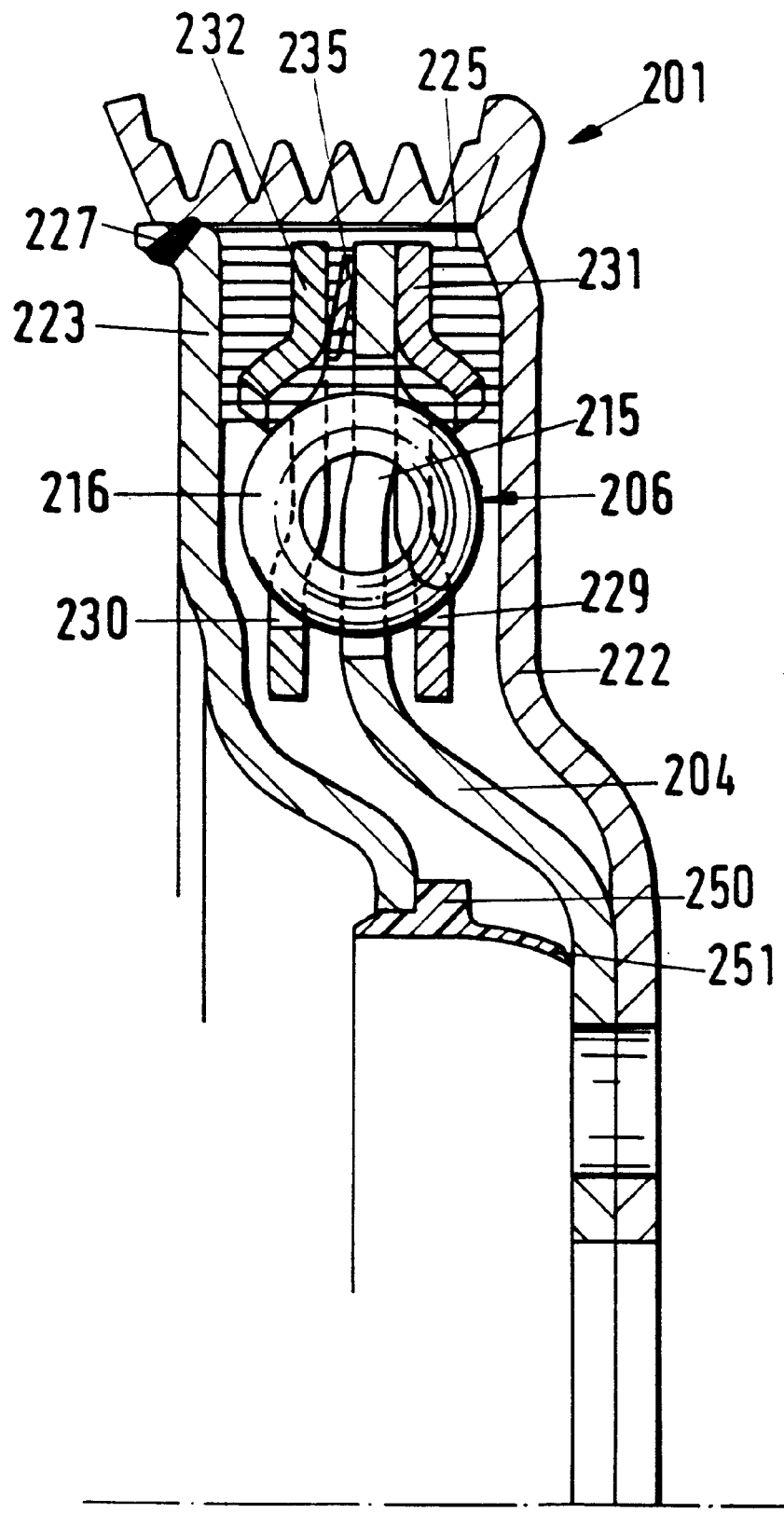
FIG. 6 is an axial sectional view of one-half of a further pulley.

FIG. 6 shows a portion of a pulley 201 having an input member with sheet metal sections 222, 223 which are sealingly secured to each other by a frustoconical welded seam 227 similar to the seam 127 of the pulley 101. Again, an advantage of the seam 227 (which extends through the radially outermost portion of the section 223 and into the inner side of the axially extending profiled portion of the section 222) is that the neighboring portions of these sections need not be finished with a high degree of precision and this does not affect the quality of the seal for the radially outer portion of the chamber 225.

The pulley 201 comprises a vibration damping device 206 which includes a mass having two disc-shaped components 231, 232. The components 231, 232 are respectively provided with windows 229, 230 for portions of coil springs 216 constituting the energy storing elements of the device 206. The coil springs 216 further engage the flange 204, at least in the circumferential direction of the pulley 201; to this end, the flange 204 has windows 215 for portions of the coil springs 216.

In order to generate a frictional hysteresis acting in parallel with the coil springs 216, the pulley 201 comprises an axially stressed resilient element in the form of a diaphragm spring 235 which is installed in the chamber 225 radially outwardly of the coil springs 216 to operate between the flange 204 and the component 232 of the mass of the device 206. Since the components 231, 232 are connected to each other by distancing elements (not shown in FIG. 6), the diaphragm spring 235 causes the component 231 to bear against the adjacent side of the flange 204. Thus, whe the fange 204 is caused to turn relative to the components 231, 232 and/or vice versa, there develops a frictional force (between the parts 204, 231) which operates in parallel with the bias of the coil springs 216 in the circumferential direction of the pulley 201.

The chamber 225 is at least partially filled with a viscous material (e.g., grease) At least a portion of each coil spring 216 dips into the viscous material in the chamber 225.

The pulley 201 further comprises a substantially tubular sealing element 251 having a collar which abuts the radialy inner portion of the section 223 and a lip 251 which engages the radially inner portion of the flange 204 to thus at least partially seal the radially inner portion of the chamber 225. The primary purpose of the sealing element 250 is to reduce the likelihood of penetration of solid and/or liquid contaminants into the chamber 225.

Figure 7A:
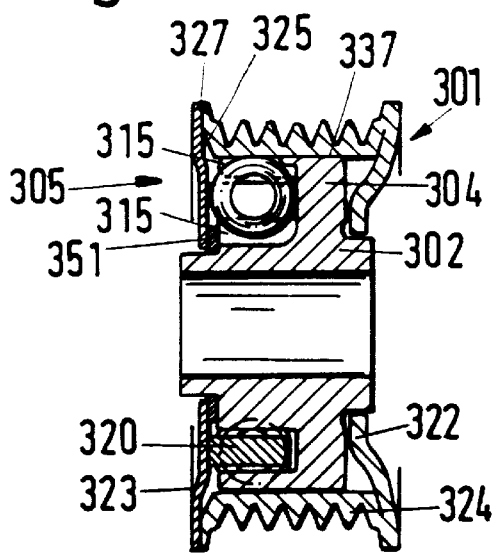
FIG. 7a is a somewhat schematic axial sectional view of another pulley.
Figure 7B:
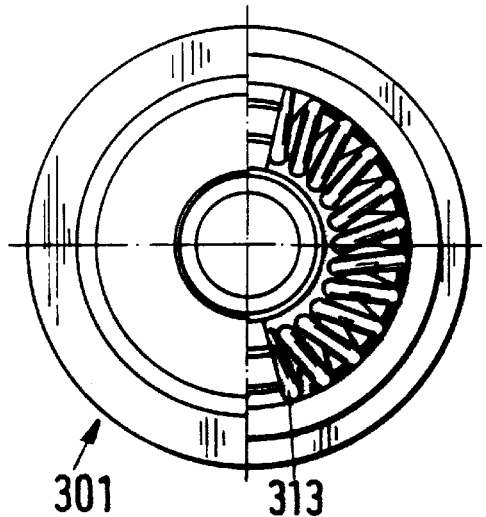
FIG. 7b is an end elevational view of the pulley of FIG. 7a, with certain parts broken away.

FIGS. 7a and 7b show certain parts of a pulley 301. This pulley comprises a damper 305 which yieldably opposes rotation of the input member (including, for example, the sheet metal sections 322, 323) and the output member (including, for example, the flange 304 and the hub 302) relative to each other. The chamber 325 of the member including the sections 322, 323 confines a friction bearing 337 and is directly surrounded by the axially extending externally profiled torque transmitting portion 324 of the section 322. This chamber contains an adequate supply of a viscous material (e.g., grease).

The coil springs 313 of the damper 305 are engaged by abutments 315 which are of one piece with the flange 304, and such coil springs are further engaged by the abutments 320 of the section 323. The flange 304 is, but need not be, of one piece with the hub 302. The abutments 320 are pins or studs affixed to the section 323.

The illustrated parts 302, 304 can be made of a single piece of suitable sintered material. However, it is also possible to produce the flange 304 and the hub 302 as two separate parts which are thereupon assembled in a manner as described with reference to FIGS. 1, 2 and 3 or in any other suitable way.

The friction bearing 337 in the chamber 325 includes the radially outermost portion of the flange 304 and the externally profiled torque transmitting portion 324 of the section 322. The materials of the portion 324 and of the flange 304 may but need not be identical, i.e., they may but need not have identical friction characteristics.

The internal surface of the externally profiled portion 324 further serves as an abutment or stop for the convolutions of the coil springs 313. The illustrated springs 313 have axial lengths several times the diameters of their convolutions (see FIG. 7b).

The radially inner portion of the chamber 325 is at least partially sealed by a ring-shaped sealing element 351 which is installed between the section 323 and the hub 302. Such sealing element 351 can at least partially prevent the penetration of solid and/or liquid impurities into the adjacent portion of the chamber 325.

The pulley 301 is provided with a gap between the hub 302 and the section 322; however, such gap can also be sealed (at least in part) by a ring-shaped element analogous to the sealing element 351 at the other side of the flange 304.

Figure 7C:
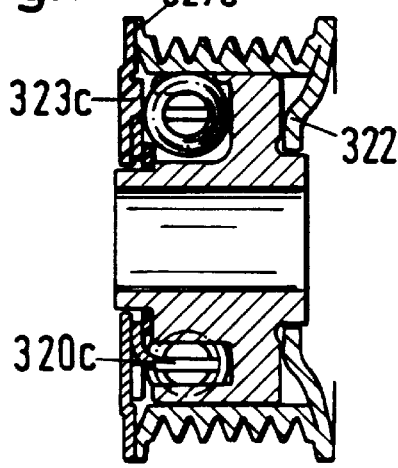
FIG. 7c is an axial sectional view showing a first modification of the pulley depicted in FIGS. 7a and 7b.
Figure 7D:
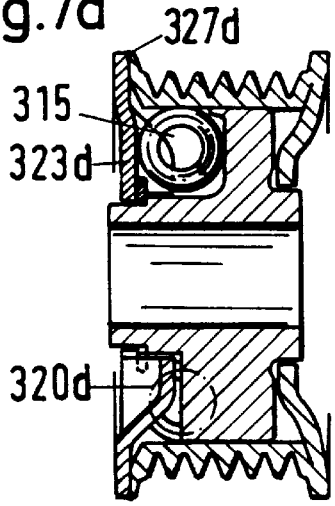
FIG. 7d is an axial sectional view of a pulley constituting a second modification of the pulley which is illustrated in FIGS. 7a and 7b.

The reference numeral 327 denotes a connection (e.g., a welded or bonded (glued) seam) between the section 323 and the portion 324 of the section 322. The connection 327 is assumed to be a welded seam, and the connection 327d of FIG. 7d is assumed to have been obtained by resorting to a suitable adhesive. The seam 327c of FIG. 7c is a welded seam which has been obtained by ultrasonic welding between a metallic section (322) and a plastic section (323c). It is also possible to make the other section of the input or output member (such as the section 322 of FIG. 7c) from a suitable plastic material.

The abutments 320 of FIG. 7a are studs or pins which are rigidly affixed to the section 323. FIG. 7c shows an abutment 320c which is a separately produced part made of sheet metal and affixed to the section 323c. FIG. 7d shows an abutment 320d which is of one piece with the section 323d.

Figure 8:
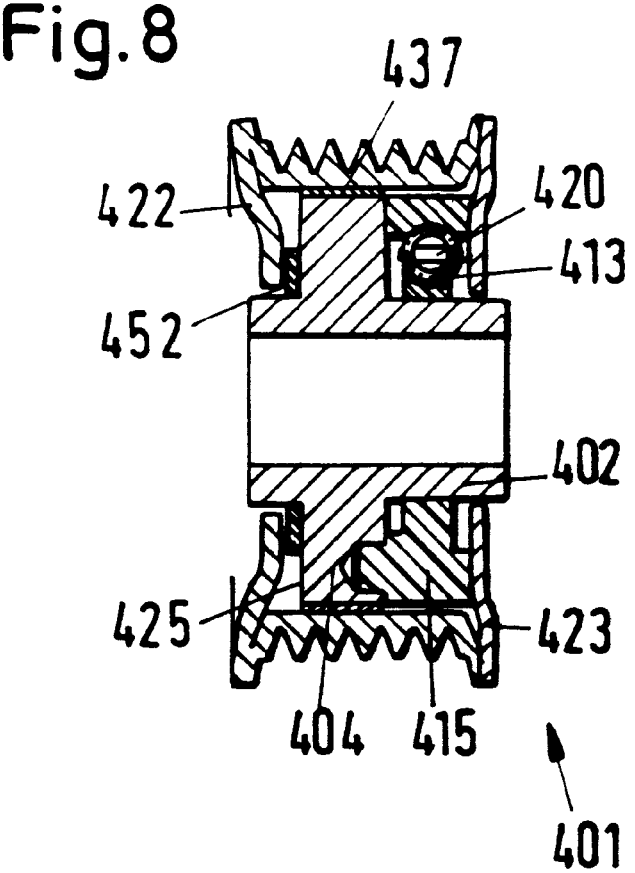
FIG. 8 is an axial sectional view of a further pulley.
Figure 8A:
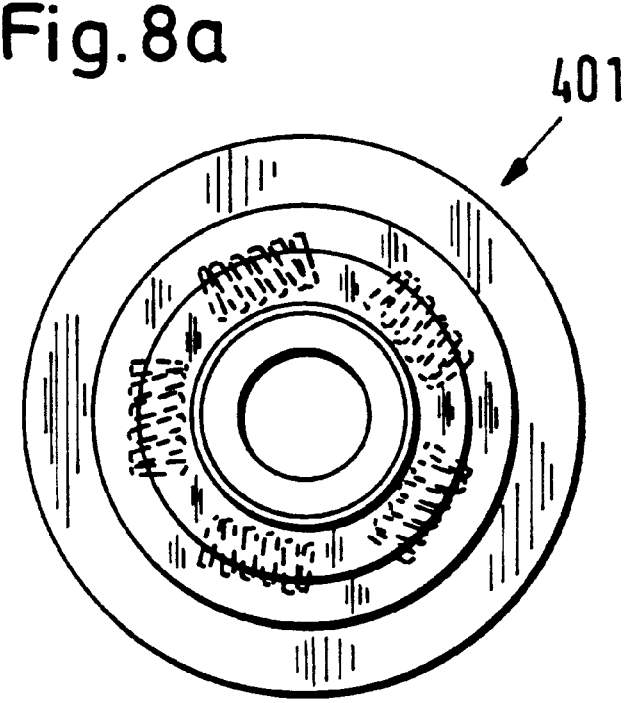
FIG. 8a is a schematic end elevational view of the pulley which is shown in FIG. 8.

FIGS. 8 and 8a show a further pulley 401. The sections 422, 423 of the input or output member of this pulley (depending upon whether the pulley 401 receives torque from or transmits torque to a rotary part (not shown) by way of one or more endless flexible elements trained over the externally profiled axially extending portion of the section 422) define a chamber 425 which does not, or need not, contain a supply of a viscous substance. If the chamber 425 does not confine a supply of viscous material, the friction bearing 437 in the chamber 425 is a dry friction bearing or slide bearing capable of standing long periods of use without excessive wear.

The hub 402 of the pulley 401 carries abutments 420 for the energy storing elements 413 which act in a circumferential direction of the pulley. The abutments 420 are separately produced parts which are made of a plastic material and can be mass produced in an injection molding machine. Such separately produced plastic abutments 420 are actually affixed to the flange 404 which is of one piece with the hub 402. For example, each abutment 420 can be of one piece with the section 423 of the member including the sections 422, 423 of the pulley 401 (such section 423 is then made of a pastic material) and can constitute a substantially tongue-like portion bent out of the general plane of the substantially disc-shaped section 423 into positions of at least substantial parallelism with the axis of the pulley 401.

The section 423 can be form-lockingly or force-lockingly connected with the section 422 of the respective member of the pulley 401, e.g., by spot welding, by resorting to a suitable adhesive, or by deforming selected portions of the section 422 and/or 423. A washer 252 is installed between the section 422 and the flange 404 to ensure a proper axial positioning of the member including the sections 422, 423 and the other member (402, 404) of the pulley 401 relative to each other. Such axial positioning is further influenced by the abutments or stops 415 between the section 423 and the flange 404. The stops 415 are or can be recessed into the flange 404.

Figure 9:
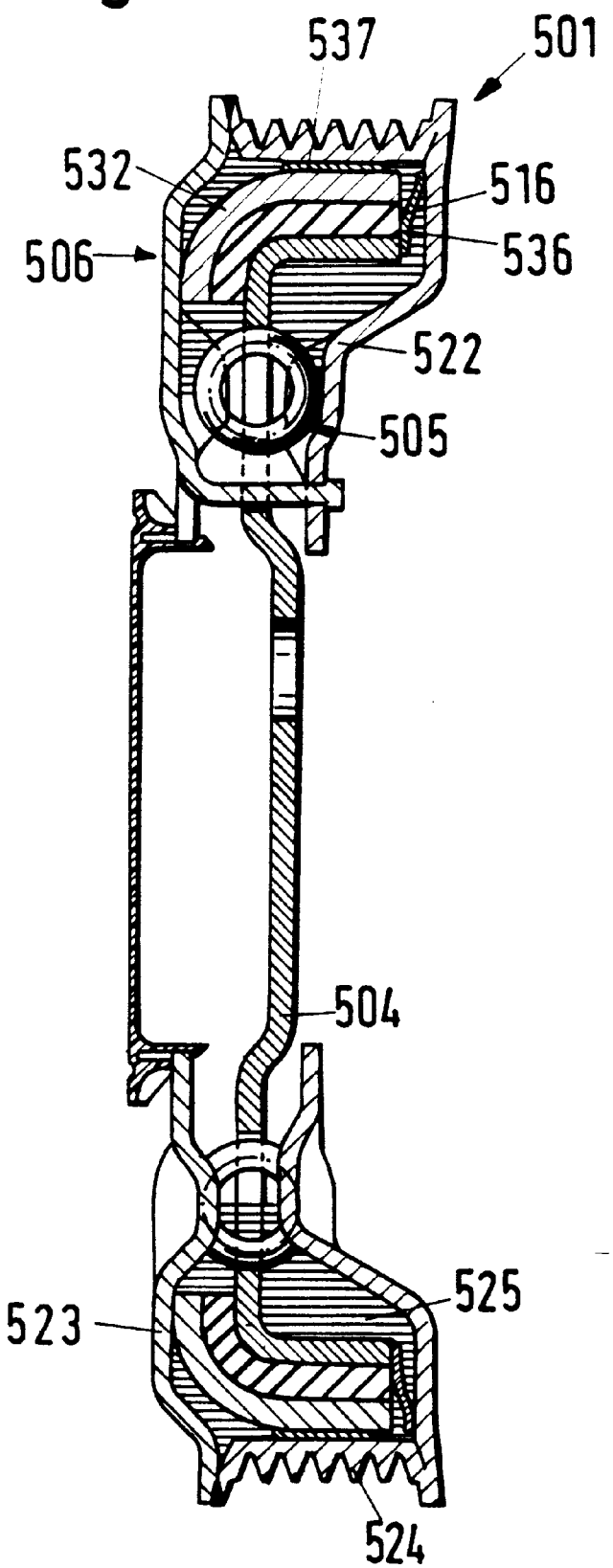
FIG. 9 is an axial sectional view of still another pulley.

FIG. 9 shows a pulley 501 having an input member with sections 522, 523 which define a chamber 525. The latter is at least partially filled with a viscous material (e.g., a supply of grease). The quantity of viscous material in the chamber 525 can be selected in such a way that it receives at least the radially outer halves of the energy storing elements of the damper 505. These energy storing elements are coil springs with a large length to convolution diameter ratio. As already explained with reference to FIGS. 1, 2 and 3, the coil springs of the damper 505 can receive their desired final arcuate shapes prior to introduction into the chamber 525.

The vibration damping device 506 of the pulley 501 comprises a mass 532 and an energy storing element 516 in the form of a spring made of an elastomeric material. The material of the element 516 can be forced into the chamber 525 or it can be vulcanized onto a part in such chamber.

The mass 532 and the flange 504 are or can be made of a metallic sheet material. The placing of the vibration damping device 506 into the chamber 525 radially outwardly of the coil springs of the damper 505 contributes to compactness of the pulley 501. The illustrated device 506 is or can be smaller (more compact) than conventional vibration damping devices which employ energy storing elements consisting of an elastomeric material; such conventional vibration damping devices are installed next to, rather than in a chamber of, the input or output member of a pulley.

The dimensions of the improved pulley 501 can be smaller than those of a conventional pulley or, alternatively, the improved pulley can employ a larger and more effective damper 505; this can ensure a much more satisfactory isolation of vibrations and/or other stray movements. As already mentioned above, a conventional pulley does not contain, but is rather adjacent, a separately produced conventional vibration damping device.

Another important advantage of the improved pulley (such as the pulley 501) is that it can constitute a self-contained arrangement of preassembled parts with or without a vibration damping device in the chamber of its input member or output member.

Since at least certain parts of the improved pulley and/or of its vibration damping device (such as the pulley 501 and its device 506) can be made of sheet metal which merely requires suitable shaping in readily available machines, such improved pulley (with or without a vibration damping device in its chamber) can be mass produced at a cost which is considerably below that of conventional pulleys with or without separate vibration damping or absorbing devices.

An advantage of the vibration damping or absorbing device 506 in the chamber 525 of the pulley 501 of FIG. 9 is that a single elastomeric energy storing element 516 can replace one or more groups of discrete energy storing elements, e.g., in the form of coil springs. This reduces the time and the cost of assembly of the pulley 501.

The friction bearing 537 of the pulley 501 is installed between the mass 532 of the device 506 and the externally profiled portion 524 of the section 522. This friction bearing or slide bearing is made of a plastic material and serves the additional purpose of centering the flange 504 and the mass 532 relative to each other. However, it is also possible to use the mass 532 as a means for centering the flange 504 or vice versa.

The pulley 501 further comprises an axially stressed resilient element 536 in the form of a diaphragm spring which reacts against the section 522 and bears upon the flange 504 and the resilient element 516. The flange 504 urges the mass 532 in the axial direction of the pulley 501 against the inner side of the section 523. This results in the development of frictional hysteresis when the section 523 and the mass 532 are caused to turn relative to each other. The diaphragm spring 536 can also cause the development of frictional hysteresis which is effective in parallel with the force generated by the damper 505 and which develops as soon as the member including the sections 522, 523 and the flange 504 of the pulley 501 are caused to turn relative to each other. Such hysteresis is active in parallel with the force of the energy storing element 516.

The diaphragm spring 536 renders it possible to mount the pulley 501 in a state of floating (as seen in the axial direction of the pulley). In addition, this diaphragm spring renders it possible to select the gradient of the resilient element 516 and the damping action in the device 506 independently of each other. Thus, the spring 536 renders it possible to select a desired moment of friction for the vibration damping or absorbing device 506.

As already mentioned above, the radially inner portion of the chamber for the energy storing elements of the damper and for the vibration damping device (if such device is used) and for the bearing need not be sealed by discrete sealing means regardless of whether or not the chamber contains a supply of viscous material. This entails savings in the manufacturing and assembly cost and eliminates the possibility of the development of unwanted hysteresis at the locale of sealing means.

Another advantage of elongated arcuate coil springs in the damper of the improved pulley is that such springs can come in direct frictional engagement with the adjacent parts, especially under the action of centrifugal force at high rotational speeds of the pulley; this furnishes an additional desirable damping action especially when the input and output members are caused to perform large angular movements relative to each other.

Without further analysis, the foregoing will so fully reveal the gist of the present invention that others can, by applying current knowledge, readily adapt it for various applications without omitting features that, from the standpoint of prior art, fairly constitute essential chracteristics of the generic and specific aspects of the above outlined contribution to the art of making pulleys and, therefore, such adaptations should and are intended to be comprehended within the meaning and range of equivalence of the appended claims.

What is claimed is:

1. A pulley comprising first and second members rotatable with and relative to each other about a common axis, said first member being an input member and said second member being an output member of the pulley, at least one of said members including two sections extending substantially radially of said axis and flanking a chamber extending at least substantially in a circumferential direction of said first member; a bearing interposed between said members; a damper arranged to oppose rotation of said members relative to each other and including at least one energy storing element acting in said circumferential direction and disposed in said chamber; and a vibration damping device including a vibration absorbing mass disposed in said chamber.

2. The pulley of claim 1, wherein one of said members is arranged to be connected to a rotary shaft and further comprising a damping unit arranged to connect said mass with said shaft.

3. The pulley of claim 1, wherein at least one of said members includes an externally profiled torque transmitting portion extending at least substantially in the direction of said common axis.

4. The pulley of claim 3, wherein at least one of said mass and said damper is located radially inwardly of said profiled portion.

5. The pulley of claim 3, wherein said profiled portion, said mass and said damper are interfitted into each other in the direction of said common axis.

6. The pulley of claim 3, wherein said profiled portion at least partially surrounds at least one of said mass and said damper, as seen in the direction of said common axis.

7. The pulley of claim 3, wherein said mass is adjacent to and is disposed radially inwardly of said profiled portion.

8. The pulley of claim 1, wherein said input member is arranged to receive torque from a rotary output device and said damper further includes an input element constituted by said input member.

9. The pulley of claim 1, further comprising a hub coaxial with said members and including a flange forming part of one of said members.

10. The pulley of claim 9, wherein said flange has at least one window for at least one energy storing element acting in said circumferential direction.

11. The pulley of claim 1, wherein said device further includes at least one coil spring acting in said circumferential direction between said mass and one of said members.

12. The pulley of claim 11, further comprising a hub coaxial with said members and provided with a flange forming part of one of said members, said at least one coil spring being interposed between said flange and said mass.

13. The pulley of claim 1, wherein said mass includes two components flanking one of said members as seen in the direction of said axis.

14. The pulley of claim 13, wherein said member which is flanked by said components includes a flange extending at least substantially radially of said common axis between said components.

15. The pulley of claim 13, wherein said components and said member between said components have at least partially registering windows, and further comprising energy storing means provided in said windows and acting in said circumferential direction.

16. The pulley of claim 15, wherein said windows include a first window provided in one of said components and having a first width as seen radially of said common axis, and a second window provided in the other of said components and having a second width greater than said first width.

17. The pulley of claim 1, wherein said device further includes at least one prestressed coil spring acting in said circumferential direction.

18. The pulley of claim 1, wherein said mass comprises two components flanking one of said members as seen in the direction of said common axis, said device further including at least one distancing element interposed between said components and extending at least in part through said member which is flanked by said components of said mass.

19. The pulley of claim 1, wherein said mass includes two components flanking one of said members as seen in the direction of said common axis, and further comprising at least one resilient element acting in the direction of said common axis between one of said components and said member which is flanked by said components.

20. The pulley of claim 19, wherein said at least one resilient element includes a diaphragm spring.

21. The pulley of claim 19, wherein said device further comprises at least one coil spring acting in said circumferential direction and disposed radially outwardly of said at least one resilient element.

22. The pulley of claim 19, wherein said device further comprises at least one coil spring arranged to operate in parallel with a friction generating assembly forming part of said device and including said at least one resilient element.

23. The pulley of claim 1, wherein said at least one energy storing element is disposed radially inwardly of said mass.

24. The pulley of claim 1, wherein said at least one energy storing element includes a coil spring having a predetermined diameter, as measured radially of said common axis, and a length as measured in said circumferential direction, said length being a multiple of said diameter.

25. The pulley of claim 1, wherein said damper includes at least two groups of energy storing elements.

26. The pulley of claim 25, wherein the energy storing elements of at least one of said groups include a first energy storing element having a first rigidity and a second energy storing element having a second rigidity different from said first rigidity.

27. The pulley of claim 26, wherein said first and second energy storing elements of said at least one group abut each other as seen in said circumferential direction.

28. The pulley of claim 1, wherein said at least one energy storing element includes an arcuate coil spring extending in said circumferential direction and having a curvature at least approximating a curvature imparted to said coil spring prior to confinement in said chamber.

29. The pulley of claim 1, wherein said at least one energy storing element engages at least one abutment provided on said first member.

30. The pulley of claim 29, wherein said at least one abutment is of one piece with said first member.

31. The pulley of claim 29, wherein said at least one abutment is a deformed portion of said first member.

32. The pulley of claim 1, wherein said chamber is defined, at least in part, by said output member and one of said sections includes an externally profiled torque transmitting portion.

33. The pulley of claim 1, wherein said output member consists at least in part of sheet metal and includes an externally profiled radially outer torque transmitting portion extending at least substantially in the direction of said axis and having a first axial end and a second axial end, a second portion including one of said sections and extending substantially radially inwardly from one of said axial ends, and at least one abutment provided on said second portion and engaging said at least one energy storing element.

34. The pulley of claim 1, wherein each of said members consists at least in part of sheet metal and said chamber is defined jointly by said first and second members, one of said members having an externally profiled torque transmitting portion extending at least substantially in the direction of said axis and the other of said members extending radially inwardly from said profiled portion and having at least one abutment engaging said at least one energy storing element.

35. The pulley of claim 1, wherein at least one of said members has an externally profiled annular portion extending at least substantially in the direction of said common axis and being radially outwardly adjacent said chamber.

36. The pulley of claim 1, further comprising a supply of viscous material at least partially filling said chamber.

37. The pulley of claim 36, wherein said viscous material is grease.

38. The pulley of claim 36, wherein at least one of said members has at least one inlet for the introduction of viscous material into said chamber.

39. The pulley of claim 38, further comprising a plastic stopper sealingly received in said at least one inlet.

40. The pulley of claim 38, wherein said chamber has a radially inner portion and said at least one inlet communicates with said radially inner portion of said chamber.

41. The pulley of claim 36, wherein said at least one energy storing element includes at least one coil spring having a radially inner portion and a radially outer portion, at least said radially outer portion dipping into said supply of viscous material.

42. The pulley of claim 1, wherein said chamber has an unsealed radially inner portion.

43. The pulley of claim 1, wherein said at least one members further comprises distancing means connecting said sections to each other, said distancing means being disposed at a first radial distance from said common axis and said at least one energy storing element being disposed at a second radial distance from said axis greater than said first distance.

44. The pulley of claim 43, wherein said distancing means is of one piece with one of said sections.

45. The pulley of claim 1, wherein said sections consist of sheet metal and said at least one member further comprises at least one threaded fastener connecting said sections to each other.

46. The pulley of claim 1, wherein said sections consist of sheet metal and said at least one member further comprises at least one rivet securing said sections to each other.

47. The pulley of claim 46, wherein said at least one rivet is of one piece with one of said sections.

48. The pulley of claim 1, wherein said sections consist of sheet metal and said at least one member further comprises distancing means connecting said sections to each other, the other of said members including a hub coaxial with said members and a flange extending substantially radially outwardly of said hub, said distancing means extending at least in part through said flange.

49. The pulley of claim 1, wherein said bearing is a friction bearing.

50. The pulley of claim 49, wherein one of said members comprises an externally profiled torque transmitting portion extending at least substantially in the direction of said common axis and the other of said members includes a flange extending at least substantially radially of said axis and being radially inwardly adjacent said profiled portion, said friction bearing being interposed between said profiled portion and said flange.

51. The pulley of claim 50, wherein said friction bearing includes a ring arranged to share rotary movements of said flange.

52. The pulley of claim 49, wherein said friction bearing includes a metallic ring arranged to rotate with one of said members.

53. The pulley of claim 52, wherein said ring contains steel.

54. The pulley of claim 49, wherein said friction bearing includes a plastic ring.

55. The pulley of claim 54, wherein said ring contains polyamide.

56. The pulley of claim 54, wherein said plastic ring contains reinforcing material.

57. The pulley of claim 56, wherein said reinforcing material includes glass fibers.

58. The pulley of claim 49, wherein one of said members comprises a flange extending substantially radially of said common axis and said friction bearing is a press fit on said flange.

59. The pulley of claim 49, wherein said friction bearing is a coat of plastic material which is extruded onto a flange of one of said members.

60. The pulley of claim 1, further comprising at least one resilient element at least indirectly reacting against one of said members and at least indirectly bearing against the other of said members in the direction of said common axis.

61. The pulley of claim 60, wherein said at least one resilient element includes a diaphragm spring.

62. The pulley of claim 60, wherein said at least one resilient element is arranged to operate in parallel with said at least one energy storing element.

63. The pulley of claim 1, wherein one of said members includes an externally profiled radially outer torque transmitting portion and said mass includes a component adjacent said member having said profiled portion, and further comprising at least one resilient element reacting against one of said member having said profiled portion and said component and bearing against the other of said member having said profiled portion and said component.

64. The pulley of claim 1, wherein one of said members includes a central hub and a flange rigid with said hub and extending at least substantially radially of said axis and away from said hub.

65. The pulley of claim 64, wherein said member including said hub further includes means for connecting said hub with said flange and an adapter in the region of said connecting means.

66. The pulley of claim 64, wherein said member including said hub further includes means for connecting said flange to said hub at a first radial distance from said common axis, said flange having at least one projection extending at least substantially in the direction of said axis and being located at a second radial distance from said axis greater than said first distance.

67. The pulley of claim 64, wherein the other of said members is said input member and further comprising a seal for said chamber, said seal being provided between said hub and said input member.

68. The pulley of claim 67, wherein said seal comprises a membrane.

69. The pulley of claim 67, wherein said seal comprises a diaphragm spring.

70. The pulley of claim 69, wherein said diaphragm spring consists, at least in part, of stainless steel.

71. The pulley of claim 67, wherein at least a portion of said seal consists of a plastic material.

72. The pulley of claim 71, wherein said plastic material is polyamide.

73. The pulley of claim 71, wherein said seal contains reinforcing material.

74. The pulley of claim 73, wherein said reinforcing material includes glass fibers.

75. The pulley of claim 1, wherein one of said members is connectable with a rotary output element of a prime mover and further comprising a closure carried by the other of said members and connectable with said output element upon connection of said output element with said one member.

76. The pulley of claim 75, wherein one of said sections is a sheet metal section and further comprising a snap-on connection between said closure and said one section.

77. The pulley of claim 75, wherein said closure comprises at least one portion which is configured to be engaged by an implement serving to facilitate separation of said closure from the respective member.

78. The pulley of claim 1, further comprising a flyweight.

79. The pulley of claim 78, wherein one of said members includes a flange extending at least substantially radially of said common axis and including said flyweight.

80. The pulley of claim 1 wherein one of said members is connectable with a rotary output element of a prime mover.

81. The pulley of claim 1, wherein said output member is connectable with an input element of an auxiliary aggregate in a motor vehicle.

82. The pulley of claim 81, wherein said auxiliary aggregate includes a light generator.

83. The pulley of claim 1, wherein one of said members includes an externally profiled portion extending at least substantially in the direction of said common axis at a first radial distance from said axis, said bearing being disposed at a second radial distance from said axis less than said first distance and said at least one energy storing element being disposed at a third radial distance from said axis less than said second distance.

84. The pulley of claim 83, wherein said mass is disposed at a fourth radial distance from said axis less than said second distance and greater than said third distance.

85. The pulley or claim 1, wherein said device further comprises at least one energy storing element acting in said circumferential direction and disposed in said chamber.

86. The pulley of claim 1, wherein said bearing is disposed in said chamber.

87. The pulley of claim 1, wherein said damper comprises a plurality of energy storing elements acting in said circumferential direction and disposed in said chamber.

88. The pulley of claim 1, wherein said device further comprises a plurality of energy storing elements acting in said circumferential direction and disposed in said chamber.

89. The pulley of claim 1, wherein said at least one energy storing element comprises a rubber spring.

90. The pulley of claim 1, wherein said at least one energy storing element comprises a spring consisting at least in part of an elastomeric material.

91. The pulley of claim 1, wherein said at least one energy storing element contains a metallic material.

92. The pulley of claim 91, wherein said at least one energy storing element comprises a coil spring.

93. A pulley comprising first and second members rotatable with and relative to each other about a common axis, one of said members being an output member of the pulley, at least said first member including two sections extending substantially radially of said axis and flanking a chamber extending at least substantially in a circumferential direction of said first member; a bearing disposed between said members in said chamber; and a damper arranged to oppose rotation of said members relative to each other and including a vibration absorbing mass in said chamber and at least one energy storing element acting in said circumferential direction and disposed in said chamber.

94. The pulley of claim 93, wherein said one member is said output member and further comprising means for connecting said output member to a rotary part of an auxiliary aggregate of a motor vehicle.

95. A pulley comprising first and second members rotatable with and relative to each other about a common axis, one of said members being an input member and the other of said members being an output member of the pulley, at least said first member including two sections extending substantially radially of said axis and flanking a chamber extending at least substantially in a circumferential direction of said first member, one of said members including an externally profiled torque transmitting portion extending at least substantially in the direction of said axis; and a vibration damping device including a vibration absorbing mass disposed in said chamber at at least one energy storing element disposed in said chamber and acting in said circumferential direction.

96. The pulley of claim 95, wherein said output member comprises means for connecting said output member to a rotary part of an auxiliary aggregate in a motor vehicle.

* * * * *